US005649185A

United States Patent [19]
Antognini et al.

[11] Patent Number: 5,649,185
[45] Date of Patent: Jul. 15, 1997

[54] METHOD AND MEANS FOR PROVIDING ACCESS TO A LIBRARY OF DIGITIZED DOCUMENTS AND IMAGES

[75] Inventors: James J. Antognini, White Plains, N.Y.; Robert Michael Cubert, Sacramento, Calif.; Henry Martin Gladney, Saratoga, Calif.; David Burns Hildebrand, Jr., San Jose, Calif.; Steven Fletcher Horne, Auburn, Calif.; Robert Walter Schmiedeskamp, San Jose, Calif.

[73] Assignee: International Business Machines Corporation, Armonk, N.Y.

[21] Appl. No.: 417,486

[22] Filed: Apr. 5, 1995

Related U.S. Application Data

[63] Continuation of Ser. No. 663,096, Mar. 1, 1991, abandoned.
[51] Int. Cl.⁶ .................................................. G06F 15/40
[52] U.S. Cl. ........................ 395/609; 395/680; 395/186
[58] Field of Search ............................... 395/601, 609, 395/610, 680, 683, 186, 188.01

[56] References Cited

U.S. PATENT DOCUMENTS

| | | | |
|---|---|---|---|
| 4,412,285 | 10/1983 | Neches et al. | |
| 4,466,060 | 8/1984 | Riddle | 364/200 |
| 4,558,413 | 12/1985 | Schmidt et al. | 364/300 |
| 4,630,196 | 12/1986 | Bednar, Jr. et al. | 364/200 |
| 4,714,992 | 12/1987 | Gladney et al. | 364/200 |
| 4,907,188 | 3/1990 | Suzuki et al. | 364/900 |
| 4,918,588 | 4/1990 | Barrett et al. | 364/200 |
| 4,920,431 | 4/1990 | Eggers et al. | 360/33.1 |
| 4,956,772 | 9/1990 | Neches | 364/200 |
| 5,012,405 | 4/1991 | Nishikado et al. | 395/600 |
| 5,093,911 | 3/1992 | Parks et al. | 395/600 |
| 5,153,744 | 10/1992 | Nobuta | 358/400 |
| 5,167,035 | 11/1992 | Mann et al. | 395/575 |
| 5,168,444 | 12/1992 | Cukor et al. | 364/401 |
| 5,170,466 | 12/1992 | Rogan et al. | 395/145 |
| 5,179,652 | 1/1993 | Rozmamith et al. | 395/155 |
| 5,218,697 | 6/1993 | Chung | 398/650 |
| 5,220,637 | 6/1993 | Bly et al. | 395/425 |
| 5,235,680 | 8/1993 | Bijnagte | 395/161 |
| 5,280,527 | 1/1994 | Gullman et al. | 380/23 |
| 5,301,350 | 4/1994 | Rogan et al. | 395/800 |
| 5,502,576 | 3/1996 | Ramsay et al. | 358/444 |

OTHER PUBLICATIONS

Simrin, Steven; *MS–DOS Bible*; 1988; Howard Sans & Co.; pp. 202–203.

Communication, European Search Report, 923014863.4, Oct. 8, 1994, 3 pages.

D.A. Arneson, "Mass Storage Archiving in Network Environments," 9th IEEE Symposium On Mass Storage Systems, 31 Oct. 88, Monterey, USA, pp. 45–49.

C. Hogan et al., "The Livermore Distributed Storage System: Requirements and Overview," 10th IEEE Symposium On Mass Storage Systems, 7 May 1990, Monterey, USA, pp. 6–17.

D.F. Reed, et al, "Automated Cartridge System Library Server", 10th IEEE Symposium On Mass Storage Systems, 7 May 1990, Monterey, USA, pp. 105–110.

J. Foglesong, et al, "The Livermore Distributed Storage System: Implementation and Experience", 10th IEEE Symposium On Mass Storage Systems, 7 May 1990, Monterey, USA, pp. 18–25.

On Mass Storage Systems, 7 May 1990, Monterey, USA, pp. 18–25.

Patent Abstracts Of Japan, vol. 14, No. 50 (P–0998) 30 Jan. 1990 & JP–A–01 279 338 (NEC Corp.) Abstract.

(List continued on next page.)

*Primary Examiner*—Kevin A. Kriess
*Attorney, Agent, or Firm*—Baker, Maxham, Jester & Meador

[57] ABSTRACT

Library service protocols are provided for moving large data objects into an out of a data image library with attention to security, authentication, and consistency of related images stored in different machines. The protocol consists of particular message sequences, special tokens within messages, and out-of-sequence database changes.

22 Claims, 8 Drawing Sheets

OTHER PUBLICATIONS

I. Kojima et al., "An Architecture Of Extensible Front-End DBMS For Object-Oriented Databases", in *Collection of Talk Drafts*, Info Proc. of Japan (Sep. 28–Sep. 30, 1987) pp. 377–379, with English translation.

I. Kojima et al., "An Object-Oriented Database Language For The Open Multi-Media Database System", in *Collection of Talk Drafts*, Info, Proc. Soc. of Japan (Mar. 6–Mar. 18, 1988) pp. 407–409, with English translation.

"A Reference Model For Mass Storage Systems" by Stephen W. Miller, Advances in Computers, vol. 27, pp. 157–211.

"Computer Networks", by Andrew S. Tanenbaum, pp. 10–26.

VMTP: Versatile Message Transaction Protocol, by David Cheriton, Version 0.3, pp. 1–28.

"Exploiting Read–Mostly Workloads, The Filenet File System" By David A. Edwards and Martin S. McKendry, pp. 58–70.

Research Report "Requirements Analysis For A Document Storage Subsystem", H.M. Gladney, P.E. Mantey, pp. 1–31.

Research Report Architecture And Design Of A Document Storage Subsystem, H.M. Gladney et al, pp. 1–47.

Research Report "The Starburst Long Field Manager" by Tobin J. Lehman and Bruce G. Lindsay, pp. 1–15.

Operating Systems "A User Authentication Scheme Not Requiring Secrecy In The Computing", C. Weissman, Editor, pp. 437–442.

AMC Transactions On Computer Systems "Secure Communication Using Remote Procedure Calls", Andrew D. Birrell, pp. 2–14.

The IPS Cryptographic Programs, by A.G. Konheim et al IBM Syst J. vol. 19, No. 2, 1980, pp. 253–283.

1

METHOD AND MEANS FOR PROVIDING ACCESS TO A LIBRARY OF DIGITIZED DOCUMENTS AND IMAGES

CROSS-REFERENCES TO RELATED APPLICATIONS

This application is a file-wrapper continuation under 37 CRF §1.62 of parent application No. 07/663,096 filed on Mar. 1, 1991, now abandoned.

BACKGROUND OF THE INVENTION

The invention concerns electronic library services in which machine-executed processes manage collections of data representing books, papers, folders, personal files, and other informational media of durable value. Particularly, the invention covers the inter-process communications which are necessary to manage a library of images in such a way as to provide access to the library while affording security, integrity authentication, and consistency of library data. The term "image" is defined more formally below. Here, and until the definition, an "image" is any digital representation of the contents of a readable medium such as paper.

Digital electronic computers have found growing use in enterprise library services. Such use can benefit from a library service in the form of common session-level, inter-machine protocols. Such protocols are particularly useful in a library of data objects to which a plurality of users may demand concurrent access and which are stored on a plurality of physically and geographically separated storage resources. The isolation of such protocols frees up for separate consideration other aspects of library management including network configuration, resource scheduling, catalog schema, and the representation and meaning of the data objects which the library embraces.

A library service subsystem executable on one or more electronic digital computers might be considered merely a specialized database management system, with a particular choice of data schema and integrity rules. However, the inventors have found that the statistics and circumstances of library use are sufficiently different from those of other database applications to warrant special attention. For example, compared to the records of a traditional database, objects in a library tend to be relatively large, relatively rarely read, very rarely changed, and not directly useful as search indices; to be economical, a library implementation must include an automatic storage hierarchy—a feature which is not found in traditional database management systems. For knowledge workers, it is neither desirable nor possible to predict to which libraries any particular worker will need access; limited only by rules to protect the owners of information, all libraries should be available with a common interface, even across enterprise boundaries.

The creation of a library service subsystem can proceed simply by addition of capabilities to existing database and file servers.

Consequently, there is a manifest need for protocols and control mechanizations directed to the management of access to distributed library data which do not constrain other aspects of library management.

SUMMARY OF THE INVENTION

The invention satisfies the requirement for a non-constraining library service technique by allowing on-demand access to data objects which are contained in a library.

A goal of this invention is to provide such access when a library user seeks to store, retrieve, or replace a data object in the library.

The goal is attained according to the invention in a data library system which stores images and/or encodings representing documents, and which includes a library server for maintaining a catalog of library images and for enabling access to library data, and one or more image servers which provide access to library storage resources for storage or retrieval of library data. Particularly, the invention is a method practicable in such a library system for moving an image between a client process and a storage resource. The method includes:

- providing a first message from the client process to the library server requesting transfer of an image between the client process and the library, the message including an image identifier identifying the image and a name of a client image port through which the image is to be transferred;
- at the library server, validating the requested transfer in response to the image identifier;
- providing a second message from the library server to an object server for ordering the transfer of the image between the client process and a library storage resource, the message including the name of the client image port;
- providing a third message from the object server to the client process for transferring the image between the client process and the library storage resource; and
- under the control of the object server, transferring the image between the client image port and the storage resource.

BRIEF DESCRIPTION OF THE DRAWINGS

FIG. 5 illustrates in further detail data objects necessary to support library server discard and replacement procedures.

DETAILED DESCRIPTION OF THE PREFERRED EMBODIMENT

Figure 1:
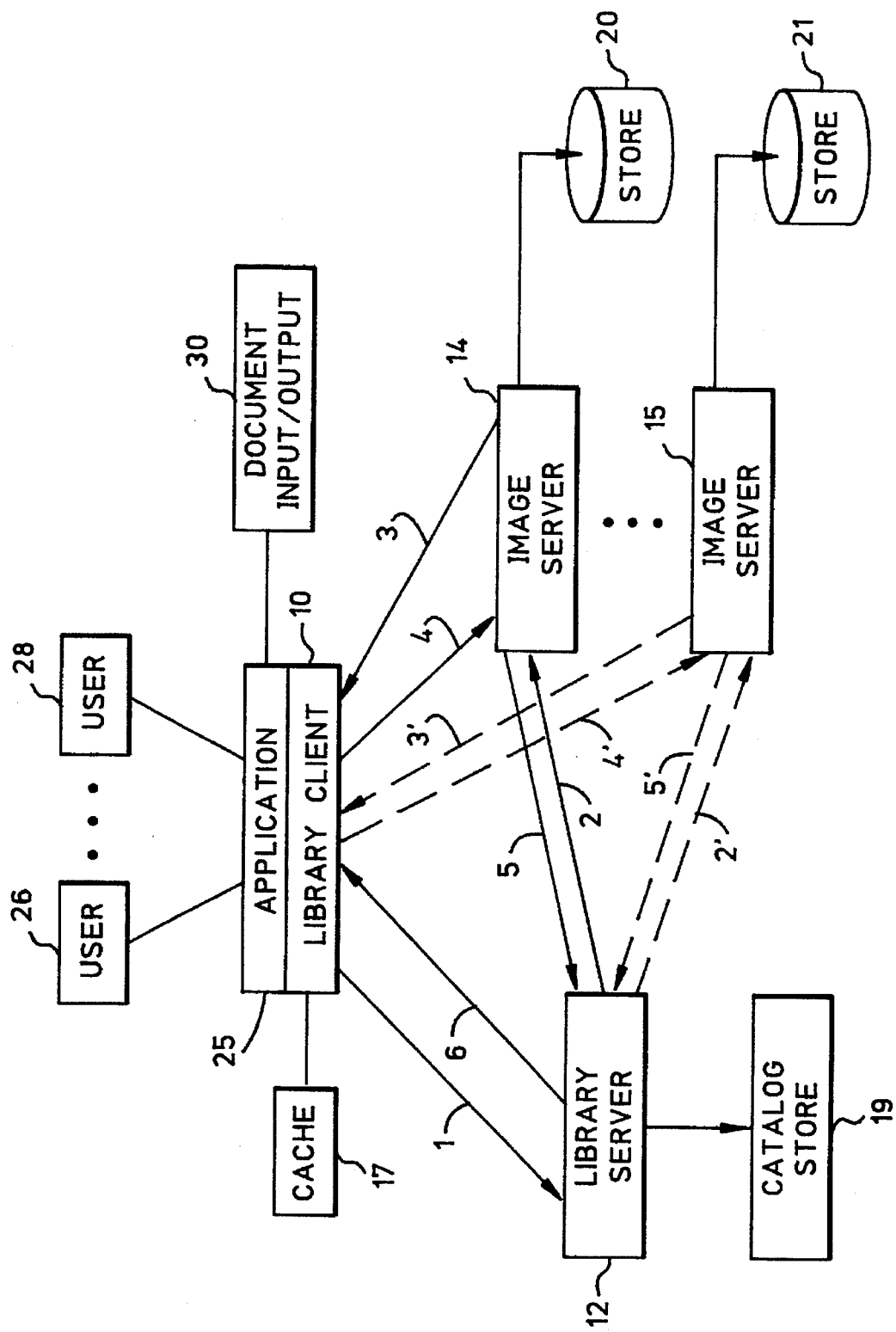
FIG. 1 illustrates interconnecting library client, library servers, and library stores.

The invention concerns a library service subsystem in the form of a set of computer programs executable on one or more electronic digital computers. Its purpose is to manage access to images which are stored in a plurality of physically and geographically separate storage resources. The invention operates to provide concurrent access to a plurality of users.

A library is the combination of a collection of reading materials and a catalog. The library service subsystem does not include dialog tools, source/sink input/output, or other end user interfaces, but is only a service suite available to application programs. It is not intended to compete with or replace file management systems, either local or distributed. The intent of the invention is to mimic conventional libraries, providing a close analog to physical collections of books and other documents. As such, the subsystem serves "knowledge workers" who demand "walk-up-and-use" services.

Library services are necessarily distributed with patrons and documents in different geographical locations. The inventors contemplate that a library employing the library service subsystem of the invention would be for the purpose of replacing the paper objects forming the library collection with data images. In this regard, data images are data representations of the paper objects normally stored in the library. Paper objects may include texts, images, or both. Data images which represent such paper objects can be large—with mean size about $4 \times 10^4$ bytes per page of scanned text and up to $3 \times 10^6$ bytes per page representing engineering data; much larger data images can exist in multi-media applications. Individual collections of documents can also be large. For example, state government and scholarly collections may contain $10^6$ to $10^8$ items. Interaction rates in such libraries of necessity are high—a library may receive $10^4$ new items per day, and collections currently on paper may have to be converted to digital form at the rate of $10^5$ pages per day.

In the description which follows, a "library" is a collection of stored images and tables describing the collection. The images are digital analogs of paper documents stored in a library and the tables are a digital representation of a conventional library catalog. The library service subsystem of the invention guarantees that any library employing it will maintain integrity conditions in the form of certain internal data consistency rules and will administer security rules defined by custodians and object owners. It is assumed that every library in the world served by the invention has a unique identifier.

The subsystem of the invention is also referred to as a "library service", and includes a set of processes which mediate access to one or more libraries. Each "library server" controls access to a single library at a time, maintaining data necessary to implement specified integrity, security, and access conditions. A "library client" is a process or task providing to one or more users the ability to exploit a library server.

Conceptually, a library patron is a potential user registered in the library catalog. Formally, a "patron" is a set of permissions to store into, search in, and/or retrieve from a specific library. This echoes the way a logon identifier to a time-sharing service works. A "library catalog" maintained by the library server associates a single patron with each image stored in the library as the "owner" of that image. Patrons may be surrogates for human users and a patron may be represented by several clients. A library client may use several libraries and may dynamically change the patron which it represents. A library employing the invention may serve many clients and many patrons which locate and retrieve each other's documents.

The library service permits an organization to make explicit or implicit contracts with library users. To each owner of information stored in the library, a custodian commits to preserve the information entrusted with specific guarantees of data integrity and security. To each user, a custodian offers means for searching for and rapidly retrieving information.

An "image" is an uninterrupted bit stream, which can represent the content of a paper page or a picture, but which could also represent an audio stream, a video sequence, coded information, or any other data collection. In this regard, "image" corresponds to the term "data object" in the sense that it is an element of data structure that is named or otherwise specified and which is needed for process execution. However, the inventors prefer to avoid use of the latter term in order not to imply any particular relationship to object-oriented programming. Each image is presumed to have a primary instance which is the standard by which the correctness of any copy is judged. So that distinct images are not confounded, libraries identify each stored image uniquely to all users and in perpetuity.

The invention offers and distributes services on a client-server approach because the expectation is that images will be stored somewhere else than the location of a user. Other familiar aspects of distributed databases can be modeled to be both easy to implement and understand. For example, it is readily accepted that each document in the library should have a single original to which any replicas must conform, and that posting of changes to replicas might not be instantaneous, providing that obsolescence of a document can be detected when necessary.

Refer now to FIG. 1, where a network for providing library services consists of one or more client processes, one of which is indicated by reference numeral 10, one or more library services, one indicated by numeral 12, and one or more image servers, two of which are indicated by reference numerals 14 and 15. Parenthetically, the inventors observe that the word "server" is often used ambiguously, even within a single reference. The term may denote a machine including a storage resource and several processes mediating access to the resource. Alternatively, it may denote one of those processes. In this description, the term "server" is used in the first sense, the word "process" being appended when the latter is intended. Similar care is taken with the term "client".

In FIG. 1, the library client 10 (and every other library client) is typically a workstation containing a local store or cache 17.

The library server 12 has a catalog store 19, which includes a database describing the contents of a library and which is used as a control point for access to anything in that library.

Each of the image servers 14 and 15 includes an image storage resource ("image store") with the image store 20 allocated to the image server 14 and the image store 21 to the image server 15. Each of the image stores maps from unique image identifiers to image values constituting the library collection. The image servers 14 and 15 are file servers; the invention provides them with constraints to ensure data security and integrity. Alternatively, the image servers 14 and 15 could be implemented with database management systems.

A single central electronic complex, including a digital computer with connected workstations, may house any combination of library clients, library servers, and image servers. However, the procedures described below assume that each client and server is housed in its own physical environment. The inventors, however, assume that client and servers may include co-located communicating processes.

Use of the library service network illustrated in FIG. 1 is provided to a plurality of users 26 and 28 through an application process 25 executing on the same machine as the library client 10. Users provide images to the library for storage therein through a document input/output suite 30 which can include, for example, an optical scanner. The suite 30 also provides for conversion of an image retrieved from the library into a human-discernible form such as a CRT image or printed document sheet.

A library network system according to FIG. 1 will generally be implemented with a mixture of operating systems, communication subsystems, database management systems, file servers, and other hardware and software components. The invention concerns aspects of inter-machine protocols in the library network which permit arbitrary network configurations and implementation technologies, which guarantee user-defined criteria of data security and integrity, and which permit scheduling and data layout decisions to optimize performance for whatever configurations are chosen.

The inter-machine protocols are described hereinbelow in language which does not suggest particular implementations, library catalog schema, or application data models. For example, the library client to library server protocols permit either a circuit-switched connection such as that provided by the stream interface of the TCP/IP communication standards which are widely used in enterprise computing environments. Alternatively, the VM/370 mainframe product available from the assignee can support the client/server protocols in a message-switched service such as that of the remote spooling communication subsystem (RSCS). In fact, for those interactions which do not require prompt delivery of remote information, the communication channel between any two communicating entities need not be open while the client proceeds. Relatedly, this means that the protocols of this invention will exist at the session level of the open systems interconnection (OSI) mode of layered communications.

Figure 2:
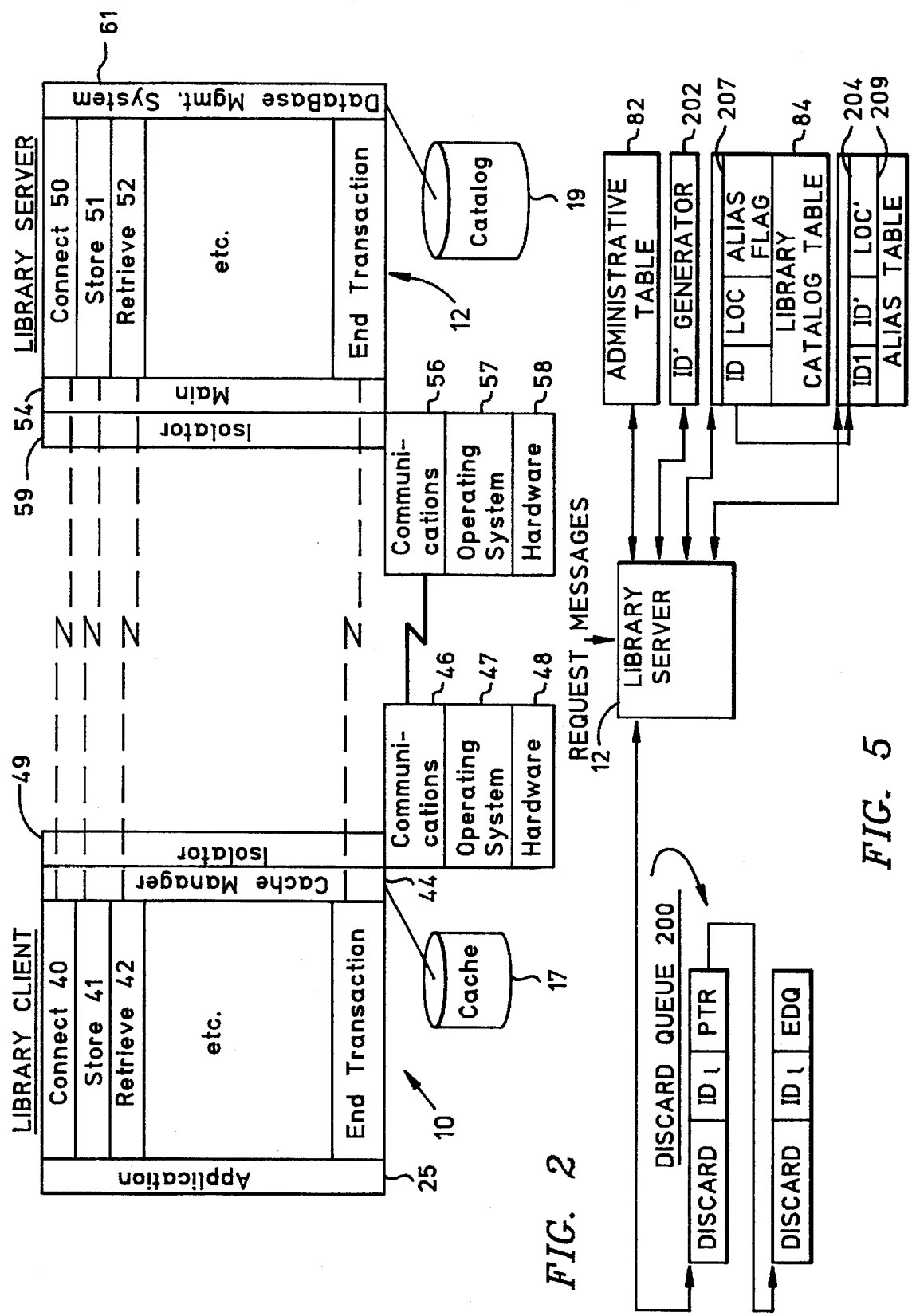
FIG. 2 illustrates a structure of a library client and library server according to the invention.

FIG. 2 illustrates the library client and library server in greater detail. The library client 10 consists of a set of library order routines activated by calls from the application program 25. Calls from the application program are, for example, to orders such as "connect" 40, "store" 41, and "retrieve" 42. A cache manager 44 is available to support execution of called orders requiring cache access in a conventional manner using cache 17. Inherent in the terminal where the library client executes are a communications facility 46, an operating system 47, and the hardware 48 necessary to support process execution.

The called orders are provided to the library server in the form of request messages to which responses are provided by the library server. An isolator 49 at the terminal where the library client executes translates requests and responses to accommodate differences among communication layers, packages messages to meet communications requirements, and manages message traffic routing for the library client 10.

The library server 12 consists of a set of order routines including connect 50, store 51, retrieve 52, and so on, which correspond with the orders in the library client 10. The library server 12 includes a main process 54 that safely permits a server task to switch dynamically from one library/patron transaction to another and to serve several clients serially. The library server includes a communication facility 56 which is linked by conventional network means with communications facility 46 of the library client, and also includes an operating system 57 and hardware 58 for process execution. The library server includes an isolator 59 which is functionally equivalent with the isolator 49 in the library client. Last, a database management system 61 is provided for maintaining the catalog store 19.

It is also assumed that the library server 12 has, or has access to, a transaction manager which provides function equivalent to that of the COMMIT command in systems based upon the relational language SQL. Preferably, the database management system (DBMS) 61 comprises the DB2 product, available from assignee, which employs SQL transaction procedures. However, the inventors contemplate that the DMBS can support a system other than SQL or be other than a relational database.

LIBRARY SERVICE PROTOCOLS

The invention concerns a protocol-based method of library access. The protocols of interest govern the relationships of data stored in four kinds of storage: library catalogs, image storages, caches, and application workspaces. The first three kinds are illustrated in FIG. 1; the application workspace is the portion of a main memory in a machine executing the library Client which is reserved for temporary storage of application program data. What the protocols are concerned with is the movement and control of image data using catalogs and catalog contents only to the extent needed to describe library performance, integrity, and security.

The below-described library service protocols can be programmed as ordinary application programs using session level communication interfaces. In addition to what commercially available operating systems provide, the inventors assume the existence and availability of certain prior art functions or services. A secure authentication service, with whatever remote access is needed, is assumed which takes an identifier and a secret token and returns a TRUE acknowledgement only if, in a map internal to itself, the identifier maps to the value of the token presented. A network name service is postulated such that any prospective client process can ask for connection to any needed server be supplied with not only addressing information, but also whatever information is needed about communication protocols. The inventors assume the existence of reliable network communications between library clients, library servers, and image servers in the sense that messages received are correct and in order and that abnormal terminations are signaled at the communications-to-isolator interface or determined by a timeout available to a waiting process. As discussed above, a database transaction management equivalent to that of SQL is presumed for implementation of each library catalog. Further, the inventors foresee that physical and administrative security will be provided to ensure that only authorized programs run in library servers and image servers, that server programs are correct and implement advertised access control and integrity rules, and that workstation users protect their library passwords. Last, prudent backup and recovery execution are presumed in library servers and image servers.

Ideally, the library service protocols of the invention provide to each user prompt access to library services, without interference in the activity of others. In response to each user-initiated command, the library service of the invention provides what is sought in the command before the initiating user desires further interaction. While these objectives are often possible, practical and economical considerations require library access in less favorable circumstances. For example, data may be too large for delivery through communication channels during the time human users are willing to wait, or may not permit prompt retrieval.

Central library services, or connection to them, may be disrupted, but such disruption should not impede users from submitting requests or using library data already collected into their workstations. Part of the connection with the library according to the invention may be manual and batch-only.

The library server protocols according to the invention can be appreciated with reference, once again, to FIG. 1. The protocols comprise three specific interfaces: library clients/library server; library server/image server; and, image server/library client. Each interface implies two protocol steps, one in each direction. Each protocol step implies a message transmitted in the indicated direction (with an implied return or acknowledgement). For storage and retrieval of images, all six protocol steps are employed. These are numbered 1–6 in FIG. 1. As described below, various combinations of protocol steps may be employed for other library service activities.

Each terminal or workstation executing a library client may have concurrent library sessions, accessing one or several libraries. When used in this description, a "session" is a sequence of library interactions under a single authorization and distinguished by a session identifier.

The client portion of a library session is a list of ready requests terminated by a single incomplete request. Calls from an application program for library service append orders to this incomplete request. Each request is a sequence of orders sent in a format described below to a library server in the form of a request message. The library server receives a request message, executes its orders sequentially, and assembles a sequence of replies which correspond, one-to-one, with the order sequence in the request message. The responses are returned in the form of a response message to the library client which sent the request message eliciting the replies.

Library orders are generated in response to calls from an application process. The classes of calls that generate library orders are summarized in Table I.

TABLE I

CONNECT defines a new session or alters a session by changing the patron and/or the library to which traffic is directed, and generates a hard-to-guess string ("capability") for use as a session password.

QUERY orders a library catalog inquiry, possibly to obtain image identifiers. This would be a SELECT call if the library catalog happened to be part of an SQL database.

UPDATE orders a change (insertion, update, or deletion) to records in a library catalog.

STORE orders an image copy from a library client cache to a library, possibly replacing an existing image, and appropriate changes in the library catalog.

RETRIEVE orders an image copy from a library to cache, or simply a last-referenced timestamp update if the cache contains a current copy.

DISCARD orders that an image be deleted from the library.

COPY orders an image copy or move from one location in an image store to another location, which might be in a different image store. (This is for library custodians; ordinary users are not permitted to control image placement or replication.)

ENDTRANSACTION orders that the changes to library contents ordered since the prior ENDTRANSACTION be committed or aborted as an atomic unit, without any effect on the cache or application states.

ENDREQUEST creates the prefix of a new request and enqueues the accumulated library orders as a request for execution, possibly waiting for the response. This effectively partitions work into batches.

Each STORE, RETRIEVE, DISCARD, and COPY call implies the execution of a process which potentially affects the states of a library client cache, a library catalog, and an image storage. The QUERY and UPDATE calls affect at most cache and library contents; in fact, these calls can be viewed as special cases of RETRIEVE and STORE/DISCARD, respectively. The CONNECT and ENDREQUEST calls regulate the traffic between the library client and other library service network components. Every application call creates a client order to a primitive server procedure such as the procedures 50, 51, 52 in FIG. 2.

The session level language between library client and library server processes consists of orders grouped into requests, with the syntax given in Table II.

TABLE II

| | |
|---|---|
| request | ::=step\|step\|...\|step |
| step | ::=initiator\|order\|...\|order |
| initiator | ::=connect\|prefix |
| connect | ::=patronid libraryid capability password |
| prefix | ::=patronid libraryid capability |
| order | ::=store\|retrieve\|discard\|copy\|... \|endtransaction |
| store | ::=capability' imageid image address imageportno |
| retrieve | ::=capability' imageid image address imageportno |
| discard | ::=imageid |
| copy | ::=imageid location boolean |
| endtransaction | ::=commit\|rollback |

In Table II, a request from the library client is a sequence of steps. Its simplest form is a single conversational step. However, a request may be a batch with any orders consisting of individual transactions partitioned by ENDTRANSACTION orders and targeted for several libraries by embedded INITIATOR orders.

An INITIATOR, similar to a batch "job card", begins each step to identify the patron for whom orders are being issued and the library which is to be accessed.

A CONNECT order consists of a patronid, libraryid, a "capability" and an authenticating string in the form of a password. A capability is a random string generated by the library client and passed to the library server in order to authenticate a particular request. In this regard, a unique capability is generated for each session and is provided in the connect order which captions a session.

A PREFIX is a connect order which omits the authenticating string (password) to minimize how often the sensitive and long-lived information traverses the communication links.

Each order corresponds to a respective server subroutine call listed in Table I. A library operation inherent in an order is a function from the order and a database state to a result and a new database state. In this regard: ORDERPROC: orderxDBstate→replyxDBstate.

A STORE order indicates that some image located at image address in the client cache is to be copied from a client buffer into the library and stored in the library under the unique identifier IMAGEID. The IMAGE ADDRESS field is the library client's handle to the image in its cache. The IMAGEPORTNO is the communication address for image transfer which connects a library client to the library services network. The order also includes a CAPABILITY'—a random string generated by the library client and peculiar to this order.

A RETRIEVE order is similar to a store order except that the store order implies movement of an image from a library client into the library, while the retrieve order implies that a library client is copying an image from the library.

The DISCARD order simply indicates to the library server an image which is to be deleted from the library.

The COPY order identifies the target LOCATION for some image and whether it is to be copied or moved.

The ENDTRANSACTION order is a commit or rollback order to indicate that preceding orders are to be confirmed in the library or effectively forgotten and that library locks held by the current session are to be released.

Figure 3:
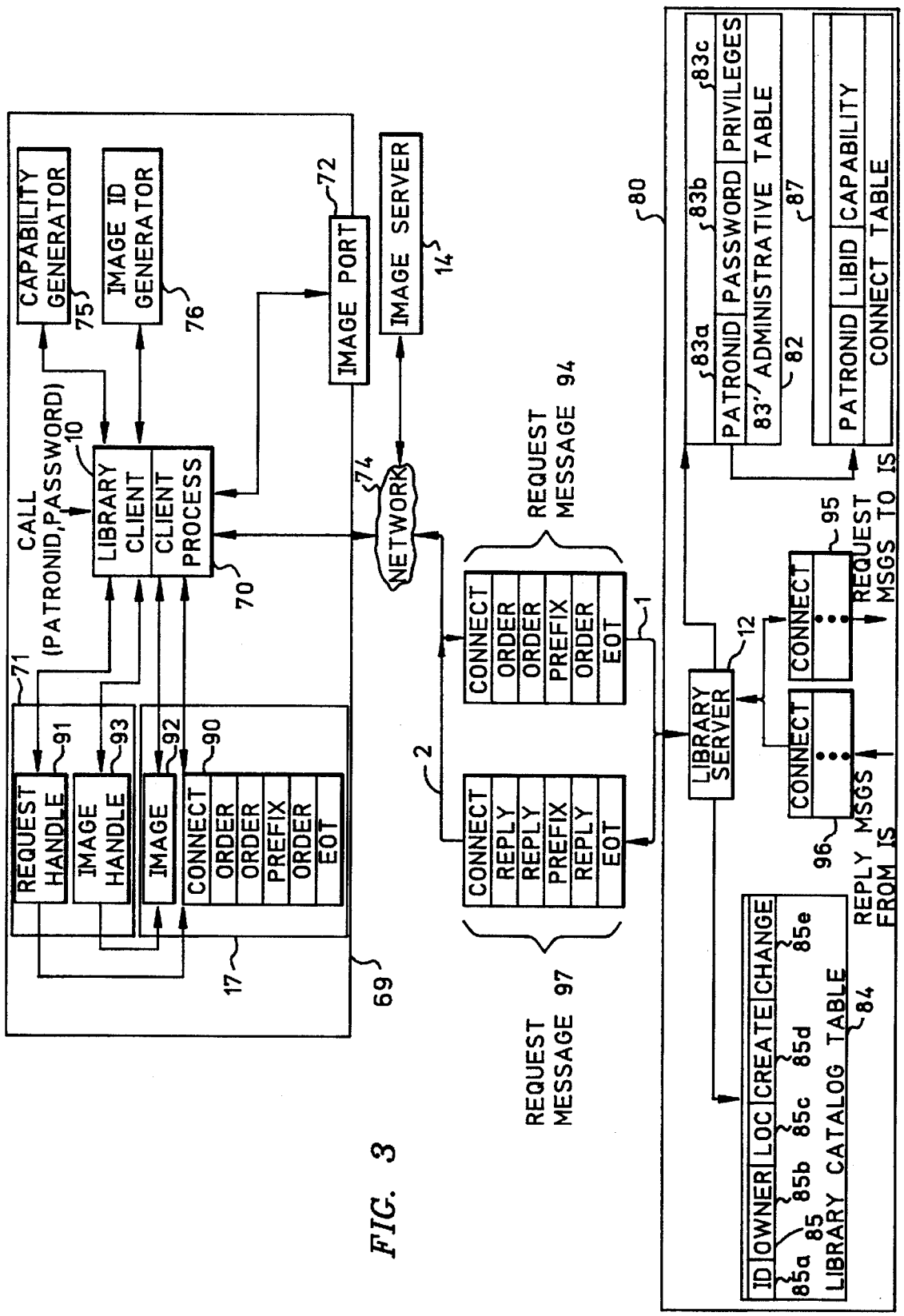
FIG. 3 illustrates message formats and data structures necessary to conducting protocol steps between a library client and a library server.

Refer now to FIG. 3 for an understanding of the client-to-library protocol according to the invention. In FIG. 3, the library client process 10 is executed on a terminal 69. A daemon process 70 manages the library server interaction for the client 10 sending a first list element whenever a list has at least two elements. The application program (25 in FIG. 1) sees asynchronous execution, buffered for any pace difference with the remote library service; execution becomes close to synchronous whenever the daemon is on a single incomplete request. Interactions of the daemon process 70 with the library server 12 and an image server such as 14 on the channels available through a network 74 and associated communications capability (not shown) are synchronous and serial. The terminal assembly includes application workspace 71 and the cache 17. Also executing at the terminal 69 are a capability generator 75 and an image identification generator 76. The generator 75 can be any known process which generates a pseudo-random number or other suitable "hard-to-guess" token which can be used with a request initiator such as a connect or prefix and a capability' as is necessary for store and retrieve orders. The generator 76 provides for the client 10 an image identifier for any image which the client is offering for deposit in the library. Since other library clients will also be offering images for storage, the generator 76 provides an identifier which is unique within the library. The operation of the generator 76 is disclosed in detail below. Last, the data comprising an image are transferred into and out of the terminal 69 through an image port (represented by 72) an address sent with store and retrieve orders as discussed above.

The electronics complex whereon the library server executes is indicated by reference 80 in FIG. 3 and is called the library server complex. The complex 80 includes the library server 12 as described above and the catalog store, which is not explicitly illustrated in FIG. 3. Among other data objects, the catalog store includes an administrative table 82 containing entries which the library server 12 uses to validate requests from any library client. A representative entry in the administrative table is indicated by reference numeral 83 and includes fields 83a and 83b for storing PATRONID/PASSWORD combinations. Administrative table entry 83 also includes a field or fields 83c listing the library privileges accorded to the PATRONID/PASSWORD pair in fields 83a and 83b. These privileges include, for example, the indication of permission to have store, retrieve, discard, and copy orders satisfied.

A connect table 87 provides a mapping from the patronid field of the administrative table 82 to an indication of currently authorized sessions. A representative entry in the table is indicated by 89 and includes the patronid, libraryid, and capability found in a prior connect order which heads a request message. This table supports a fast check of subsequent prefixes which may be encountered in the request message or subsequent request messages. The catalog store 19 also includes a library catalog table 84. The library catalog table corresponds essentially with the card catalog of a library in that it lists all of the images stored in the library, their locations, and other information relevant to the library service protocols of the invention. A representative library catalog is indicated by reference numeral 85 and includes a first field 85a for storage of the IMAGEID identifying an image stored in the library. The field 85b identifies the "owner" of the image, that is a patron which controls access to this image in the library. The owner normally is a patron registered in the administrative table 82. The location field (LOC) 85c identifies where the image is stored. A fourth field (CREATE) 85d indicates when the image was first deposited into the library and entry into this field consists of a date/time timestamp available to the library server 12 by way of its transaction manager. The field CHANGE 85e contains a date/time character which indicates when the image was last changed.

Library service is provided to an executing application program by a message exchange protocol, two steps of which are provided in the library client/library server interface of FIG. 3. These correspond with steps 1 and 6 indicated in FIG. 1. The series of calls by an application program result in the assembly and transmission of a request message. A request message represents a portion of a session conducted between the application program and the library client which is initiated by a CONNECT call during which a PATRONID/PASSWORD pair is passed from the application to the client. In response, a request message is built, placed in the cache 17, and pointed to by a request handle in the application workspace 71. An example of a request message is indicated by reference numeral 90, and the message is pointed to by a request handle 91 bound to the application program and accessible to the process 70. Assume that an image 92 is the subject of one or more of the orders in the request message 90. The image is pointed to by an image handle 93 in the application workspace 71 and is accessible thereby to the process 70.

The connect order in the request message 90 obtains the PATRONID, LIBRARYID, and PASSWORD of the calling application. When the connect order is called, library client 10 obtains a capability from the capability generator and places it in the connect order. The orders in the message 90 are assembled, using the capability generator 75 to obtain a capability' and receiving the IMAGEID and IMAGE fields from the calling application. The image port address is appended to the order, when necessary.

The message 90 includes a connect initiator, followed by two orders, a prefix initiator, followed by a single order, and an endtransaction (EOT) order requiring either commit or rollback for the all the preceding orders back to the last EOT order.

When the message is assembled, it is placed by the daemon process 70 onto the network 74. The request message on the network is indicated by reference numeral 94 and is received by the library server 12 at the library server complex 80. The library server 12 places a copy 95 of the request message into its workspace where it processes the sequence of orders, beginning with the connect order.

Processing the request message requires the library server to validate the request. To validate, the server 12 consults the administrative table 82 to confirm that the PATRONID/PASSWORD pair in the order has a corresponding entry in the table 82. Assuming that the PATRONID/PASSWORD pair in the connect order has a corresponding entry in the administrative table, the library server begins to process the orders in their sequence. If the PATRONID/PASSWORD pair is found, the library server adds the corresponding PATRONID/LIBRARYID/capability row to the connect table entry 87, to be used with prefix orders in lieu of connect orders in later orders in the session. In this respect, order processing requires the library server 12 to confirm that the privileges accorded to the PATRONID/PASSWORD pair include the particular order. If the privileges accorded to the pair include the order, the library server 12 accesses the library catalog 84. If an order is a store order, library catalog access is for the purpose of building a catalog entry for the image which is to be stored. For this purpose, the library server builds uses some tables and procedures not shown to choose one of a plurality of image servers and possibly a place within this image server—the pair image server/place together constituting a location—and the catalog entry by placing the IMAGEID in the ID field of the entry, the PATRONID in the owner field, the location where the image is to be stored in the LOC field, and a time date entry for the CREATE field obtained via the log manager. If the order is for retrieval of an image, the library server locates the catalog entry for the image by indexing the ID fields of the catalog entries. The LOC field indicates where the image is located.

Armed with the necessary IMAGEID and location information, the library server 12 constructs a request message for the chosen image server including the address of the client's image port, the image information (such as the application workspace handle), the library ID, the capability and capability' tokens, and possibly the place information just generated.

Assuming successful request execution, the sequence of request messages sent to image servers elicits an ordered sequence of replies which are queued by the library server until all orders have been filled. The replies are assembled into a response message having the same format as the request message. The response message built by execution of the orders in the request message is indicated by reference numeral 96. When the last order is fulfilled, the response message is transmitted in the form indicated by reference numeral 97 through the network 74 to the client process 70. The replies in the response message 97 form the basis for responses to the calls of the application program.

TRANSACTION MANAGEMENT IN THE LIBRARY SERVER

The basic library integrity and security objective is that any client should be constrained to authorized data elements in authorized modes and that usage should be traceable to known individuals. The basic integrity objective is that the data in the library catalog and the image servers should conform to certain rules of inter-relationship, e.g., that catalog entries should truly indicate locations. Therefore, the library server process accesses the administrative and library catalog tables and sends commands to image servers only upon the privileges authorized by, for example, a library custodian. In this regard, the administrative table 82 permits the library server process to validate each order by checking that the order is permitted in the set of privileges accorded the current patron. Assuming that the server programs are correct and are not subverted, and that patron identifiers are authenticated, this ensures the basic quality objective.

As described above with reference to FIG. 2, the library server main routine 54 supports dynamic switching and serial service of multiple clients. To accomplish this, the main routine ignores steps for which the PATRONID/LIBRARYID pair is not authenticated and discards uncommitted work when asked to change the served patron/library pair, as given by the process steps in Table III.

TABLE III

1. Main 54 ignores any orders that precede the first acceptable initiator in each request, and also any orders between a failed connect and the first successful connect that follows.
2. Connect 50 (re)establishes a session for some [PATRONID, LIBRARYID] pair. Main 54 aborts any uncommitted database changes in the current session at the beginning of connection.
3. When responding to a connect, main checks that the password corresponds to the entry made by an administrator for the library and patron identified. If [PATRONID, LIBRARYID, PASSWORD] is acceptable, the main enters [PATRONID, LIBRARYID, CAPABILITY] into the table 87 it maintains in the server activation. The capability is needed for subsequent prefix checks.
4. Main accepts a prefix if and only if it finds [PATRONID, LIBRARYID, CAPABILITY] in the table 87 built by connect executions. In effect, the capability is a temporary password which validates that the current server process has authenticated the [PATRONID, LIBRARYID] claimed.
5. Main binds to the [PATRONID, LIBRARYID] pair identified in the latest acceptable initiator element. If an incoming prefix is acceptable and changes this binding, main aborts uncommitted database changes to protect against stray orders.
6. Main executes no orders between an unacceptable initiator element and the next acceptable initiator.
7. If an order execution terminates in a way that is not recognized as benign, main aborts uncommitted database changes and ignores subsequent orders up to and including the next commit or next acceptable initiator (whichever comes first).

The library client application program interface allows any sequence of ENDTRANSACTION, ENDREQUEST, and other calls by allowing any relationship between transaction boundaries and request boundaries. Each request can be batch of many orders including multiple commitments and connects. In the most exposed case (serial reuse of a server processor by many clients) the steps of Table III assure library integrity; the worst that can happen is that applications will see rollbacks instead of commits. Of course, an application discovering its server will be serially reused should call ENDTRANSACTION immediately before each ENDREQUEST. Thus, a single main server routine and subroutines can be used in a batch remote job entry system such as the OS/MBS system available from the assignee and an interactive transaction system such as the MVS/CICS product available from the assignee.

When considered in this description, an image server is substantially what has been referred to as a bitfile server. In this regard, see S. W. Miller, A Reference Model for Mass Storage Systems, ADVANCES IN COMPUTERS (M. C. Yovits, Ed.:27, pp 157–210, (1988)). Image servers can be file servers, file systems within standard operating systems (for example, data sets in the MVS product available from the assignee), or sets of fields in relational databases.

For optimization, it is expedient to move images between an image store and a library client on different logical channels than control communications, even for images which happen to be co-located with their catalog entries. In effect, this delegates assignment of physical channels and multiplexing to the communication subsystem which is not a part of this invention.

STORE PROTOCOL

To store an image in a library according to the invention, a library service protocol according to the invention is implemented in six-part message sequence whose steps are labeled 1–6 in FIG. 1. Steps 2'–5' correspond to steps 2–5, but involve a different image server. The message sequence cascades client-server interactions so that a workstation acts as a client of a library server, the library server acts as a client of one of its image servers, and the image server acts as a client of a cache management task in the workstation.

Figure 4:
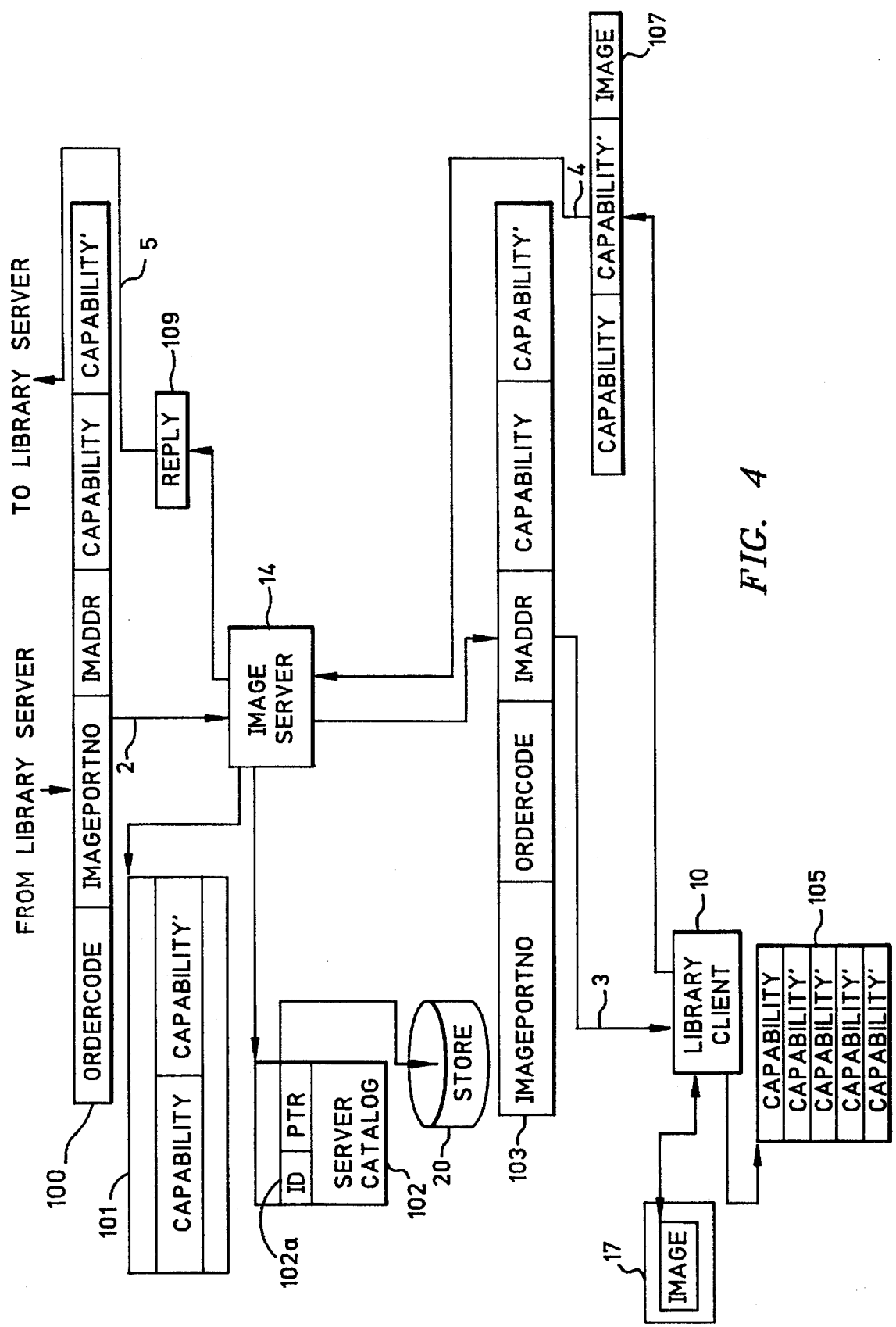
FIG. 4 illustrates message formats and data objects necessary to support protocol steps conducted between a library server and an image server and between an image server and library client.

To store an image, refer to FIGS. 1, 3, and 4, and to the following steps:

1. In protocol step 1, the library client 10 prepares its image transmission port (72 in FIG. 3) for a read and then sends the library server 12 a request message which includes at least an initiator/order pair. Assume that the initiator is a connect, which includes PATRONID/LIBRARYID/CAPABILITY/PASSWORD. Assume that the connect is followed by a store order including CAPABILITY'/IMAGEID/IMAGE ADDRESS (cache location and size)/IMAGEPORTNO. The client sets up a task which waits on its identified image port.

2. The library server 12 receives the request message and validates the request by locating the PATRONID/PASSWORD pair in the administrative table 82 and confirming that this pair is accorded the privilege of storing images in the library. Assuming that the request message is validated, the connect initiator is added to the table as entry 83. Validation also requires that the library server 12 access the library catalog to confirm that IMAGEID is unique. Following validation, the library server 12 chooses an image server and prepares a request message to send to the identified server. A request message for an image server, referenced by 100, is illustrated in FIG. 4. This request message contains an order code indicating the required operation (store, in the example), IMAGEID, the image port address, the image address in the cache, the initiator capability and the capability' unique to the order. Upon receipt of operation the command message, the image server 14 retains the capability/capability' pair in its catalog 102. The image server maintains an image store catalog 102 When it receives the request message, it makes catalog entry 102a which includes IMAGEID and a pointer to image store space where the image will be written. Next, the image server constructs a request message 103 to send to the library client 10.

3. In protocol step 3, the request message is sent from the image server 14 to the read image port address of the library client 10. The message contains the order code for the required read process, the image address and size, and the capability/capability' pair. The image server-to-library client request message for this protocol step is indicated by reference numeral 103 in FIG. 4. It should be appreciated that the request message sent to the library client 10 does not have to identify the client.

4. Upon receiving the image server request message 103, the library client 10 indexes through its request messages to find the capability/capability' pair sent in the request message 103. The client uses the capability token to validate the authenticity of the request received from the server and employs the capability' token to validate the specific order implied in the message. A structured list of capability and capability' fields of a stored request message is indicated by reference numeral 105 in FIG. 4. Such a list is implicit in the copy of the request message sent by the client to the library server. Upon validating the request and the specific order by the capability/capability' pair, the client obtains the image from the cache 17 and places it in a reply message provided to the image server 14 as protocol step 4. The reply message from the library client to the image server is indicated by reference numeral 107 in FIG. 4. The reply message includes the capability/capability' pair. Upon receiving the reply message 107, the image server authenticates the security of image transfer by comparing the received pair with the pair stored in 102a. Assuming equivalence, the image server 14 deletes the stored capability/capability' pair, stores the image returned in the reply message 107 in the library store 20 and constructs a reply message to confirm the storage.

5. In protocol step 5, the image server 14 sends a reply message 109 to the library server which is appropriate to signify completion of the storage of the image in the library store 20. Upon receiving the reply, the library server appends it to a response message being prepared for transmission to the library client. At this point, the library server 12 conducts any necessary updates of its library catalog 84 to reflect storage of the image in the library. This would include creation of a library catalog entry for the image and placement of the entry in the library catalog table 84. Optionally, the image server 14 could have returned the capability/capability' pair stored at 102 to allow the library server to authenticate protocol execution to this point.

6. In the sixth step of the protocol, the library server 12 returns to the library client a response message including the reply 109 received from the image server in protocol step 5. Later, in the same library session, possibly after several requests have been executed, the library client requests the change commitment in the form of an end of transaction order, following which the library server will commit all catalog changes for the session.

Retrieving an image from the library to a client involves six protocol steps which are similar to those just described, except that the image server and the client move the image in the opposite direction through a client image write port.

DISCARD AND REPLACE PROCESSING

Figure 6:
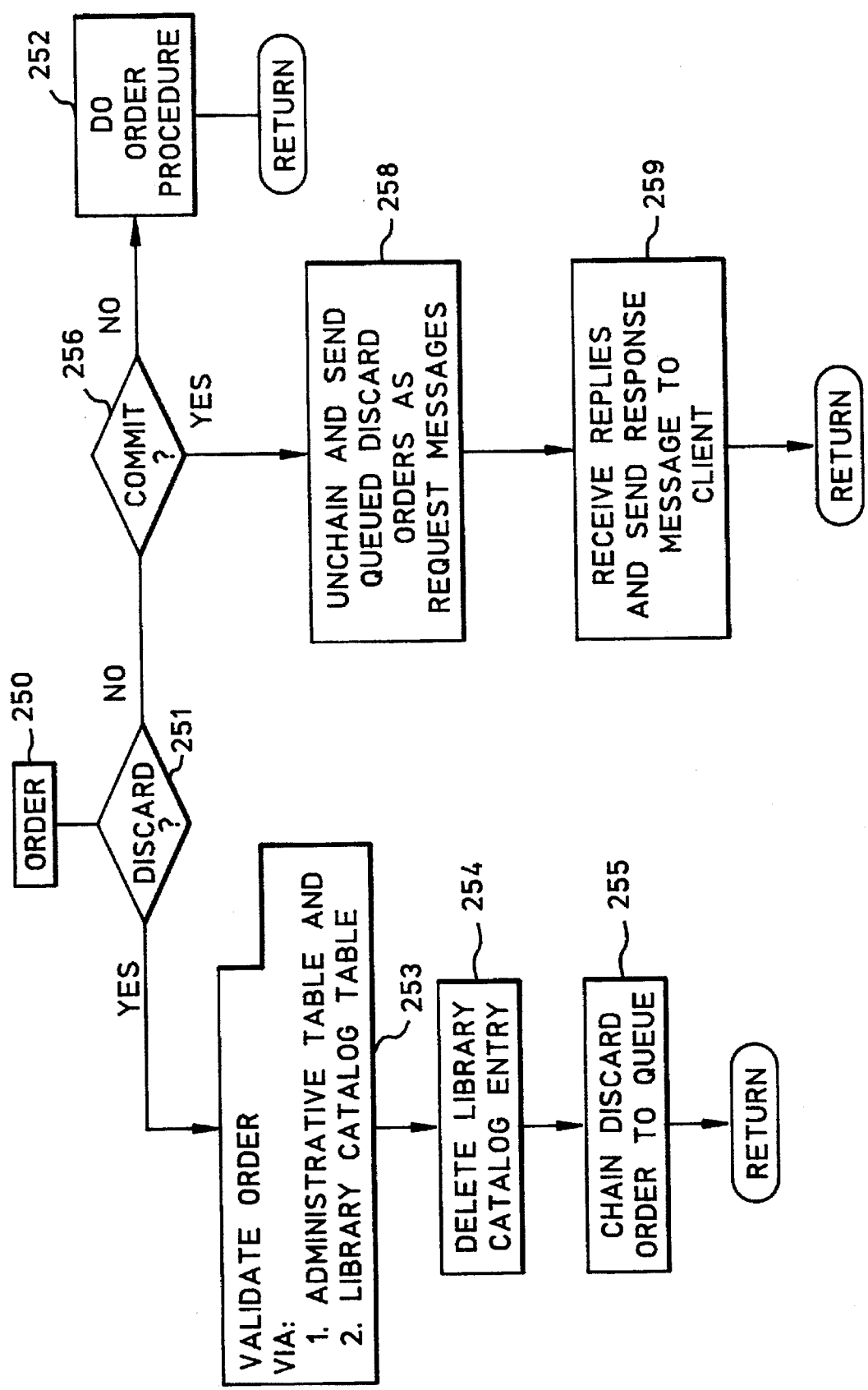
FIG. 6 is a flow diagram illustrating a library server procedure supporting a discard order.
Figure 7:
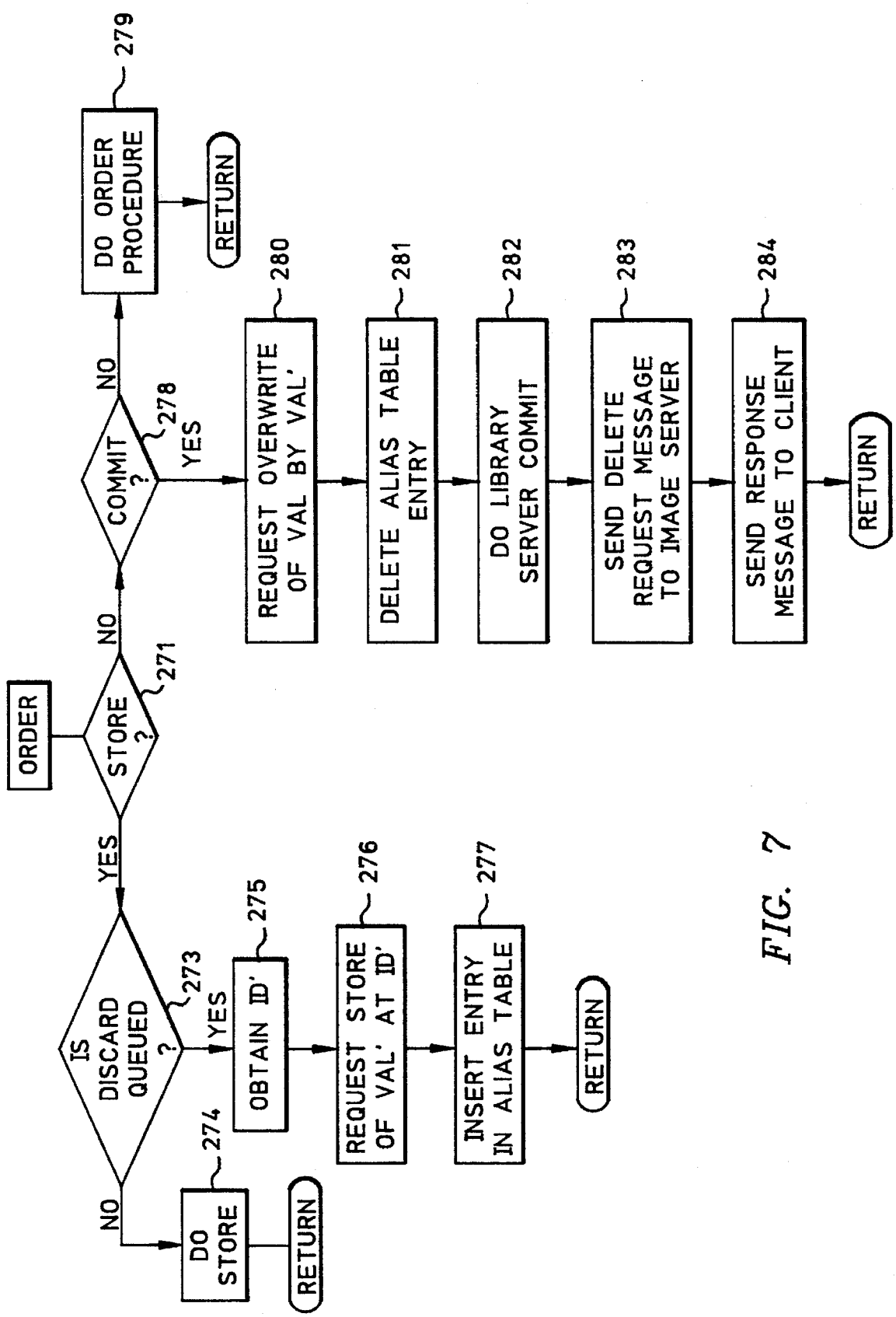
FIG. 7 is a flow diagram illustrating a library server procedure supporting a replacement order.

Discarding and replacing an image in the library can be understood first with reference to FIG. 5, and then with reference to FIGS. 6 and 7, respectively. FIG. 5 illustrates additional data structures provided at the library server site for conducting discard and replacement procedures. The discard and replacement procedures are initiated by request messages input from the library client in the format described above. These messages are received by the library server 12. In order to conduct discard and replacement processing, the library server must consult the administrative and library catalog tables 82 and 84, respectively, for order validation. All discard orders received in a session are chained to a discard queue 200 for processing in response to a session commit order. Each entry in the discard queue 200 corresponds to a respective discard order in a session request message. Each new entry includes the discard order and the IMAGEID for the image to be discarded. In FIG. 5, the discard queue 200 has entries for discarding images identified by imageid's IDi and IDj. For replacement processing, the library server 12 uses an identification generator 202 for generating an alias imageid, ID', for an image whose replacement has been ordered. An alias table 204 is used in replacement processing to map an image being discarded (identified by the imageid ID) to a location where its replacement is stored.

The discard library server protocol according to the invention can be understood with reference to FIGS. 1, 5, and 6. To discard an image, the library client transmits a request message including a discard order as protocol step 1. Upon receiving a discard order, the library server executes protocol step 2 by sending a discard request message to an image server. The image server discards the image and returns an appropriate discard reply to the library server. This step, step 3 of the discard protocol, occurs between the image server and the library server without message exchange between the image server and the library client. In step 4 of the discard procedure, the library server sends a response message including a reply to the discard order, the message being sent to the library client.

FIG. 6 illustrates the discard procedure from the point of view of the library server. Initially, the library server takes up an order at 250 contained in a request message from the library client. In decision 251, the order is evaluated to determine whether it is a discard order. If the order is a discard order, the positive exit is taken from decision 251. Following the positive exit, at 253, the library server checks that the order request is valid by inspecting the privileges accorded to the PATRONID/PASSWORD pair in the initiator which captions the order and confirming that the image which is to be discarded is entered in the library catalog table 84. Assuming that the order satisfies the validation criteria, the library server at 254 deletes the library catalog entry for the image which is to be discarded. Following this, the library server at 255 chains the discard order to the discard queue 200. After the order is chained, the process returns to the caller. Returning to decision 251, if the order is not a discard, a decision 256 is made. If the order is not a commit, the library server executes the correct procedure for the order at 252. If the next order is a commit order, the positive exit token taken from 256 and the library server commits its catalog changes including the deletion of the catalog entries for the images chained on the discard queue 200. Then, at 257, the library server unchains and sends the queued discard orders as request messages to the image servers at 258, the library server awaits the image server replies elicited by the discard request messages, places the replies into a response message, and sends the response message to the library client.

The steps required to support a replacement protocol according to the invention can be understood with reference to FIGS. 1, 5, and 7. Assuming that replacement of some image identified by IMAGEID $ID_n$ is requested within a single transaction, it is assumed that there is first an order to discard $ID_n$ followed, before an intervening commit order, by an order to store $ID_n$. Review of the discard procedure described above will serve to show that the image server would execute the discard after the store operation; depending upon the implementation of the image server, this could result in either an abnormal termination at the attempt to store over an existing image, or else a dangling reference.

Since the store and discard orders do not commute, the library server temporarily carries an old/new image pair, as follows. Given that an image denoted by identifier ID has a value VAL which is to be replaced by a new value VAL', assume that ID' is unique temporary identifier. Locating an image always involves the library server because the library store contains a relation IMAGE which maps image identifiers to locations in image stores. The mapping is via the library catalog table 84 where an entry for the image ID, in addition to all of the fields described above with reference to FIG. 3, includes a bit field labelled ALIAS FLAG. When the ALIAS FLAG bit is set, the identifier ID points to a corresponding entry in the alias table. The entry is indicated by reference numeral 209 in FIG. 5 and includes a field for the client-generated image identifier, ID in this case, a field for an image identifier ID' generated at the library server site by 202 and a location field (LOC') denoting an image server storage location.

The protocol for replacing VAL by VAL' in the image identified by ID, executed as part of some session P is shown in FIG. 7. Initially, at 270, an order is inspected. In decision 271, if the order is not an order to store the image ID, the negative exit is taken and the decision 278 is encountered. Assuming that the order is to store image ID, the positive exit is taken from 271, decision 273 is encountered and the discard queue is inspected to determine whether a discard order for image ID has been queued. If not, the store procedure is conducted as described above at 274. If a discard order for image ID has been queued, the implication is that it was received prior to the store order in the current session P, since orders are processed according to the sequence which they have in the request message. Therefore, if the positive exit is taken from decision 273, the discard/store sequence for the image ID is detected, implying that the library client wants to replace VAL by VAL'. Therefore, at the positive exit from decision 273, the library server at 275 obtains a unique image identifier ID' from the generator 202. At 276, the library server constructs and sends a message requesting storage of image representation VAL' under the identifier ID'. This causes the selected image server to engage in storage protocol steps 3 and 4 (FIG. 1) with the library client. Assuming conventional image server operation, the image representation VAL' will be stored by the image server at a location indexed by the image identifier ID'. The library server waits at step 276 until it receives positive acknowledgement (store protocol step 5 in FIG. 1) from the image server. When the image server executes store protocol step 5, the library server at 277 inserts the record (ID, ID', LOC') into the alias table, sets the alias flag bit in the ID record of the library catalog table 84, and returns to the next order in the request message. Returning to decision 278, if the order received is not a store order, decision 278 is encountered. If the order is not a commit, the process conducts the correct order procedure at 279. If a commit has been encountered, the procedure will take the positive exit from decision 278. At this time, the library server may commit the transaction which includes the changes described. In step 280, if and only if the transaction is committed, the library server orders the image server (or image servers, if more than one replacement procedure is in process) to overwrite VAL by VAL'. In this regard, the image server involved in the replacement procedure changes its library store catalog entry for ID to index to VAL'. Following acknowledgement of the overwrite requested at 280, the library server at 281 deletes the record (ID, ID', LOC') from the alias table 204, resets the ALIAS FLAG in the ID entry of the library catalog table 84 and commits the changes at 282. When the changes are committed at the library server, the delete request message is sent to the image server to delete the ID' entry from its index. Following this, a response message is sent to the client at 284 including replies to both the discard and store orders.

Whenever retrieval is requested for an image identified by ID and the alias flag bit for the corresponding library catalog table record is set, the corresponding alias table entry is read to obtain a new image identifier ID' and location LOC'. The library server orders the image server to deliver the image denoted by ID'. If the alias flag is reset, the library server orders the image server to deliver the image denoted by ID.

To understand that the just-described replacement process is correct, consider, with reference to FIG. 7, what happens for a request to retrieve ID both for a replacement process P and for some other process P'. If the replacement process has not proceeded to 277 by the time P' orders retrieval of image ID, the process P' retrieval yields VAL and results in a shared lock on ID, forcing P to wait until P' commits. When the library server proceeds to 277 of FIG. 7, the procedure P receives an exclusive lock on ID. Following this, P' has no access to the image being replaced until library server commitment at 282 and, therefore, cannot retrieve an inconsistent value. Because each session is serial, the library server can receive no retrieval requests in P until after step 277 is acknowledged to the client process. Retrieval any time after 277 will yield VAL as described above. For either P or P', if the commitment ordered in step 278 is accomplished, the image representation VAL' will be fetched as long as the alias record exists. Since the overwrite in step 280 occurs before the alias record is deleted in step 281, VAL' will also be fetched after step 281. If step 278 is not executed (for example, through abnormal termination or deliberate transaction abortion) the alias record (ID, ID', LOC') will vanish. The image server record (ID', VAL') and, therefore, also the image VAL' will be inaccessible to any application, and may scavenged by a garbage collector. If step 280 is completed but not step 281, re-execution of step 281 effects no change. If step 281 is execution incompletely, with the catalog entry but not the image store content being erased, the ID' entry in the image store is not accessible to applications. Its space may be reclaimed by garbage collection.

STORE-TO-STORE COPY PROTOCOL

The store, fetch, discard and replace operations suffice for end application service. An operation to copy from one image store to the other is necessary for library maintenance. Assuming an implementation of store-to-store copy with authorization restricted to privileged clients, the sequence of messages for the procedure is illustrated in FIG. 8.

The procedure involves the following steps:

1. The library client 10 requests that some image identified by $ID_i$ be copied to the target image store 21 and that the copy be identified by $ID_j$.
2. The library server 12 orders the target image server 15 to prepare to receive an image denoted by $ID_j$. The target image server 15 readies its image port.
3. The library server 12 orders the image source server 14 to send the image denoted by $ID_i$ (which it has ascertained to be stored in image store 20) to the target image server 15.
4. The source image server 14 sends the data to the target image server 15, which is prepared to receive it and knows how to catalog it.
5. The target image server 15 acknowledges receipt to the library server 12 which updates the library catalog table.
6. The target image server acknowledges receipt to the source image server 14.
7. The source image server 14 indicates to the library server 12 that it has completed.
8. The library server 12 indicates to the client that it has completed.

Figure 8:
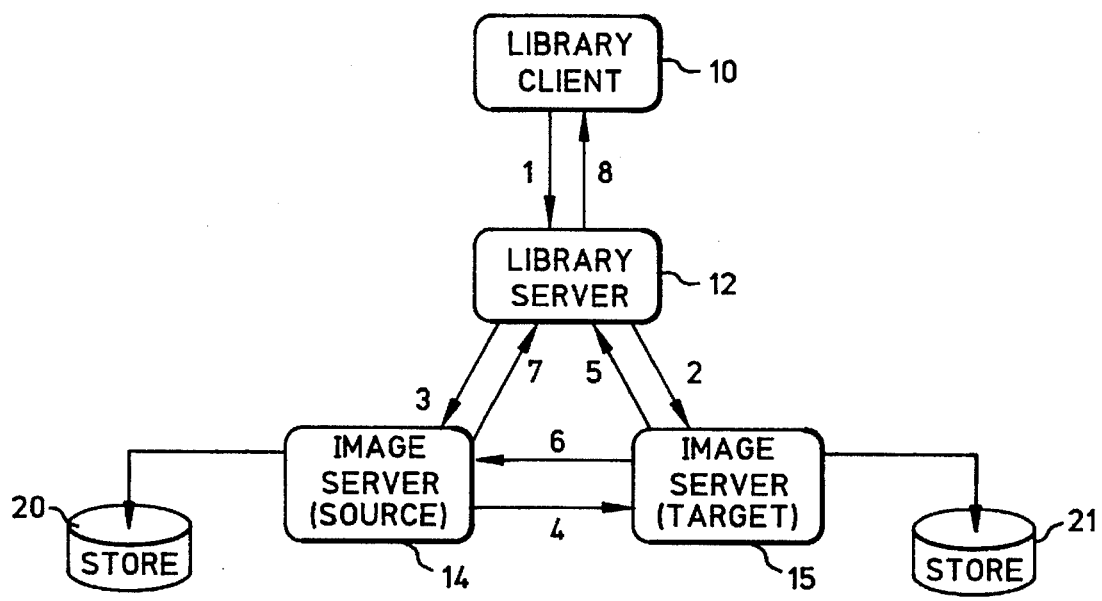
FIG. 8 is a network diagram illustrating the protocol steps necessary for image server-to-image server copying of a library image.

FIG. 8 shows the only failsafe sequence that avoids race conditions. Authenticating tokens (capability and capability') are used to prevent counterfeiting as an extension of what has already been described.

The case in which the image is to be moved instead of copied could be implemented as a copy followed by a discard; however, it may be cheaper simply to delete the image server source catalog record when the library server receives its message from the target image server than to erase the source image store copy when the source image server hears from the target image server.

IMPLEMENTATION CONSIDERATIONS

In an implementation of library service protocols described above, it is expected that abnormal termination of client/server communications can occur. Recovery from such termination can be included in the library subsystem using conventional techniques, thereby relieving application programmers of much of this responsibility. From the point of view of the client, a client-server communication link failure is approximately equivalent to a server failure; from the point of view of the server, it can be treated as a client failure.

The semantics for recovery resemble semantics for a remote procedure call, enhanced by transaction recovery properties which are described above in connection with the main routine in Table III. Requests which do not contain commit orders will be effectively ignored when failures occur. If the server crashes before a response is received, no permanent database change will occur; only data in the client is needed to choose the resumption point. If the client fails, the server can simply ROLL BACK database changes and either terminate or wait for a monitor to start a new session.

If a request contains a single transaction and the server crashes, the client's response depends on the database actions requested, on how long it would take to re-establish communications, and on what the client has in progress. For a simple query, retry might be appropriate. On the other hand, if appending to a log is requested, this would risk duplicate records; the client must check whether the transaction completed in the server before it retries. In COMPUTER NETWORKS, (Second Edition), Prentice-Hall, (1988), A. S. Tanebaum describes the alternatives: submit exactly once, submit at most once, and submit at least once. An ENDREQUEST retry parameter which includes a timeout value, controls which alternative is used. In the former two cases, the application may have to query the library catalog to check whether the server completed the transaction in spite of the disruption. If a failed request contains several transactions, the application must check how much of the work was committed.

How a library server handles client failure depends upon how far it has progressed in the current request. If all data other than the response have been moved before the client fails, the server executes the request to completion. If it detects the data have not been received, it aborts the current transaction and all subsequent transactions in the request. The response cannot be delivered and may be purged.

Since each image server is enslaved to a library server, image server failures present no unusual challenge.

The basics of caching and buffering in each workstation and regional caches to serve clusters of workstations are not novel. What the inventors have realized is that replicas distributed throughout the library network are kept consistent and current to known, acceptable levels, that access control reflecting data owners' wishes is delivered by the above library service protocols in conjunction with commonly available system elements, and that network usage is as efficient as is theoretically possible.

Since workstations can detach from the network, it is not possible to prevent two users from independently updating acquired copies of an object and then attempting to replace the library copy with their amended versions. The work of one user must be lost or repeated. The best that can be done is to prevent lost information which no one notices until a later time when someone inspects the object.

The objective must be to protect against inadvertent conflicting updates and to use the periods when each cache is connected to the library store for bringing cache and library store contents into concordance.

Users wanting to avoid making image updates which come into conflict with those of other users can check out objects. The library includes a registry of objects which users have locked for limited periods. A checkout operator signals that the caller wants control of a specific set of images. When an image is checked out, only the patron who controls it may change it or its catalog descriptors. If control cannot be granted, the reply communicates which user has control; presumably, this information will be used outside the system to negotiate who has control; since update conflicts for large objects are likely to be most common between users in the same department, this will be effective. In essence, this library service will replace what is commonly done between project members of engineering, programming, or other document manipulating groups.

Such checkout service is necessarily voluntary, and only protects the invoking user from foreign updates to the objects the user has acquired. Locking objects in a library cannot prevent conflicting updates. The user wanting to overwrite changes made by some other user needs only to wait until the latter user frees the object in question.

Independently of checkout, it is possible to protect against inadvertent conflicting updates in the library. These might arise from activities in different workstations which are detached from the library and each other when the changes are made, and which subsequently attach to the library to replace the same image. The question to be answered is what are the maximal guarantees that can be enforced even if the network partitions so that the library and two processes updating (replicas of) an object cannot communicate at the time when updates are being made. The checks for conflicts are limited to those that can be made when some process attaches each local store to the library store, but which do not require that these attachments be concurrent.

Consider some process A which fetches an image that was last updated in the library at time t. If some other process B updates (replaces) that part at time t' in the library, and if later A attempts to replace the part, A is prohibited from making the change. Since there may be any number of replicas, the timestamp t must accompany each cached replica as it is moved or copies about the network. The check for violation is t<t' in the image replacement code of the library server; since both timestamps have been taken from the library server clock, no clock synchronization problem arises. While a conflict can occur, it will not go unnoticed.

The user who encounters such a conflict can retrieve a fresh copy, reconcile his changes and store the reconciled version. He or she may sometimes want to overwrite the library copy, losing its changes, and must be provided an escape mechanism to do this. In the invention, (s)he can discard the library copy and then store a new version. This is the only circumstance in which some user needs to retrofit changes.

If two or more processes compete for access to an image in a shared cache, integrity can be maintained by the usual means—exclusive control associated with read-write access and read-only access to shared images. As usual, there are potential deadlocks that must be detected and resolved.

In view of the low probability of image update, an optimistic approach to cache currency promises good performance at low cost. Suppose that a cache may hold data from several libraries and that each image cache is derived from library records pertaining to a single document. For instance, a cached object might contain some subset of the pages of a document plus some catalog descriptors. (A single image held in a cache entry is a special case.)

1. The library catalog associates with each document a single optimistic time stamp. This is set to the value in the library server clock whenever any record associated with the document is changed. A catalog record may refer to several documents; if such a record is changed, the optimistic time stamp for every cited document is reset.
2. A cache maps each triple [libraryid, documentid, selectid] to a pair [timestamp, object] where the timestamp is a copy of the optimistic time stamp from the library catalog taken when the object is copies from the library to the cache. The selectid identifies the procedure that selected and assembled portions of the document identified from the library identified.
3. A cached object is out of date whenever its cache time stamp is smaller than the catalog optimistic time stamp for the corresponding document.
4. From time to time, an obsolescence manager selects a library represented in the cache and collects all associated [documentid, timestamp] pairs. A server part of this obsolescence manager determines which documents have been changed more recently than related cache entries and returns the set of obsolete documentids to the client port.
5. The client part of the obsolescence manager either drops obsolete objects from the cache or refreshes them by invoking the associated selection procedures.
6. The obsolescence manager can execute either in a daemon or in its own process. Executions can be triggered by application events or by internal events.
7. For the rare occasion when an application needs assurance that it has an "up to the minute" copy, cache and catalog time stamps can be compared for the single document. This is helpful only if a communication echo is much faster than copying an image from the server to the client.

This procedure is best when the number of objects cached is smaller than the number of objects which change between obsolescence management events. If this is not the case, it is better to reverse the procedure, sending from the library to the cache the identifiers of documents that have changed since the previous obsolescence management event. Such an algorithm is a variant of a method invented for more demanding circumstances. See, for example, U.S. Pat. Nos. 4,714,992 and 4,714,996, which are assigned to the assignee of this patent.

Security for images necessarily depends on the security enabling features of the underlying operating systems, except that weaknesses there can be compensated by using encryption. It must be shown that library data can be restricted to uses its beneficial owners sanction, or rather, how to propagate basic security properties to library data (since it is not an objective of this inventor to afford improved security for database and file systems). In the invention, this may be accomplished under the additional restrictions that this should introduce no new administrative burden for users or administrators of data and no need to modify any software—operating system or prospective library application—apart from the storage subsystem itself.

It will be seen that, as in many security systems, what is described depends on adequate protection of authenticating tokens—specifically the library passwords of each user and custodian. The weakness of this assumption is notorious.

It must be shown that images stored in a library will not be revealed to or corruptible by workstation programs whose users are without appropriate privileges, that exposures of passage across public networks are covered, and that cached image replicas can be protected against violations by users other than those that caused their presence.

The inventors presume that the desired access control rules are tabulated in the library catalog as interpreted by the connect, store, ... subroutines, and that the library service includes additional routines to modify these tables, with execution of these routines being recursively controlled by previously tabulated control rules.

The client-server split naturally protects against workstation programmer improprieties if servers are protected by the usual computer center physical and administrative security measures and if server programs from trustworthy sources are installed only by trustworthy administrators. In the library server, every request is checked for a currently valid capability, then for privilege to the operation requested, and also to each item alluded to. Apart from the risk from virus programs, the library damage possible by a deliberate invader is limited to the data and actions for which he has valid or purloined passwords.

The image stores are protected by making each image server responsive only to orders from a library server associated with its owning catalog. If this is deemed insufficient protection, stored documents can be encrypted under additional keywords stored in the library catalog. These keywords can safely be passed among machines, given the communication link measures about to be described.

The risks in communication channels are theft of information, unauthorized changes to library contents, and disruption by playback attacks. The communication service (e.g., TCP/IP) on which an implementation is based may itself contain enough protection. If not, the protection described below can be implemented entirely in the isolator routines shown in FIG. 2; in addition, these routines can encapsulate the decision of adequacy of the basic communication service.

For an unsecured link, adequate protection depends on the use of a secret string (the capability) in every request, as follows. In a connect order, the client sends the patron identifier in the clear and the patron's password, a timestamp, and a random string, all encrypted together by the password; knowing the identity of the patron, the server can decrypt, confirm the identity, and save the random string. This string is referred to as a capability; it comprises a pattern to be used in the rest of the session as proof that the presenter is authorized to use some associated set of resources. The client sends each subsequent message encrypted under the capability, but with the patron identifier in clear text. This cryptogram will have no obvious relationship to any other message, but can be decrypted by the server; it is valid only for a particular session. Playback attacks can be repelled by a current timestamp or message sequence number within each cryptogram. Further, one can repel an eavesdropping cryptologist by including a fresh random string in each message before encryption, ignoring this part in the server. A by-product of these measures is protection against information theft.

Finally, image server to client connections are authenticated by forwarding the capagility/capability' pair from the library server to the image server to the client for matching. The randomly-generated token, in concert with measures to prevent message eavesdropping, ensures that images delivered are not counterfeits.

IMAGE IDENTIFIER GENERATION

Figure 9:
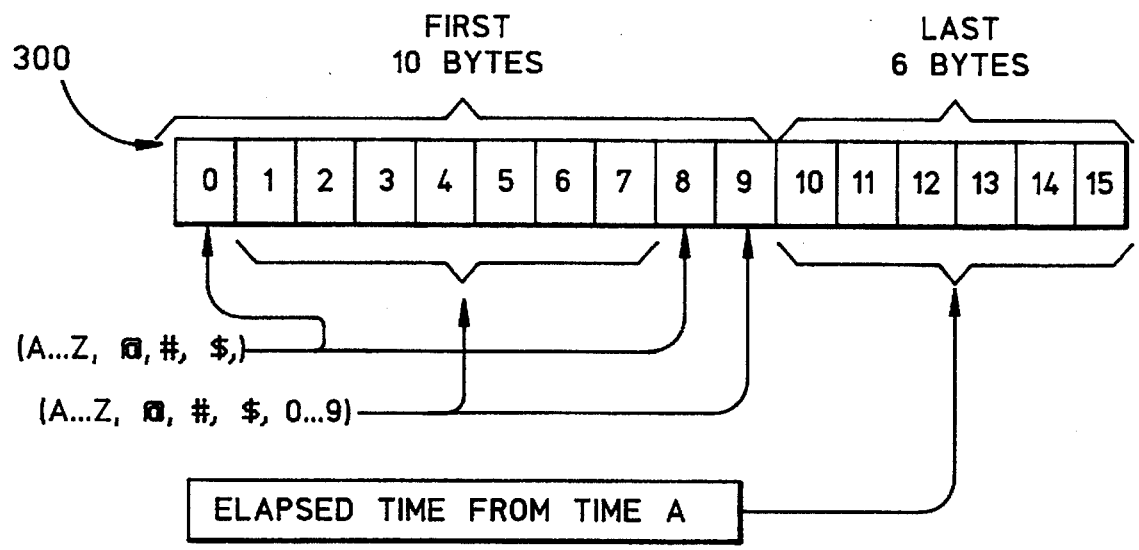
FIG. 9 illustrates how an image identifier is constructed according to the invention.

The requirement given above that image identifiers must be unique within each library is satisfied by an image generation technique illustrated in FIG. 9. Preferably, this technique is implemented in the image identification generator 76 of FIG. 3 and the ID' generator 202 of FIG. 5. According to the preferred technique, an image identifier 300 is a 16-byte identifier for which the first ten bytes are chosen randomly from the representations of upper case alphanumeric characters in the set (A ... z, @, #, $, 0 ... 9), except that the first and ninth characters are drawn from the set (A ... Z, @, #, $); the final six bytes encode the elapsed time from some fixed past moment denoted as TIME A. For example, TIME A might be midnight between 1990 and 1991. The elapsed time is encoded precise to the nearest minute. The inventors observe that this technique will provide image identifiers that are unique within any library and which are never reused. The particular scheme illustrated in FIG. 9 permits certain significant performance and implementation advantages over other choices. For example, clients can choose permanent library identifiers for images without connecting to libraries, avoiding the cost and complication of a temporary to permanent identifier mapping operation which must be coordinated between the client server. The chance that two disconnected workstations choose the same identifier is less than $10^{-15}$. Thus, 6000 years' worth of identifiers are available. Further, the identifiers according to the invention do not cause "hot spots" when they are used as indices in the library catalogs. Each half (8-byte portion) of an identifier is a file name part in many current operating systems. Implementations can exploit this benefit to avoid tabular mapping from image identifiers to file names in image servers. Last, each image identifier can be used as an encryption key word for its image and for cache catalog records, permitting a very simple method for read security in shared caches and on network links. Specifically, the first 8 bytes of each identifier can be used as data encryption standard (DES) key word.

BEST MODE

Figure 10:
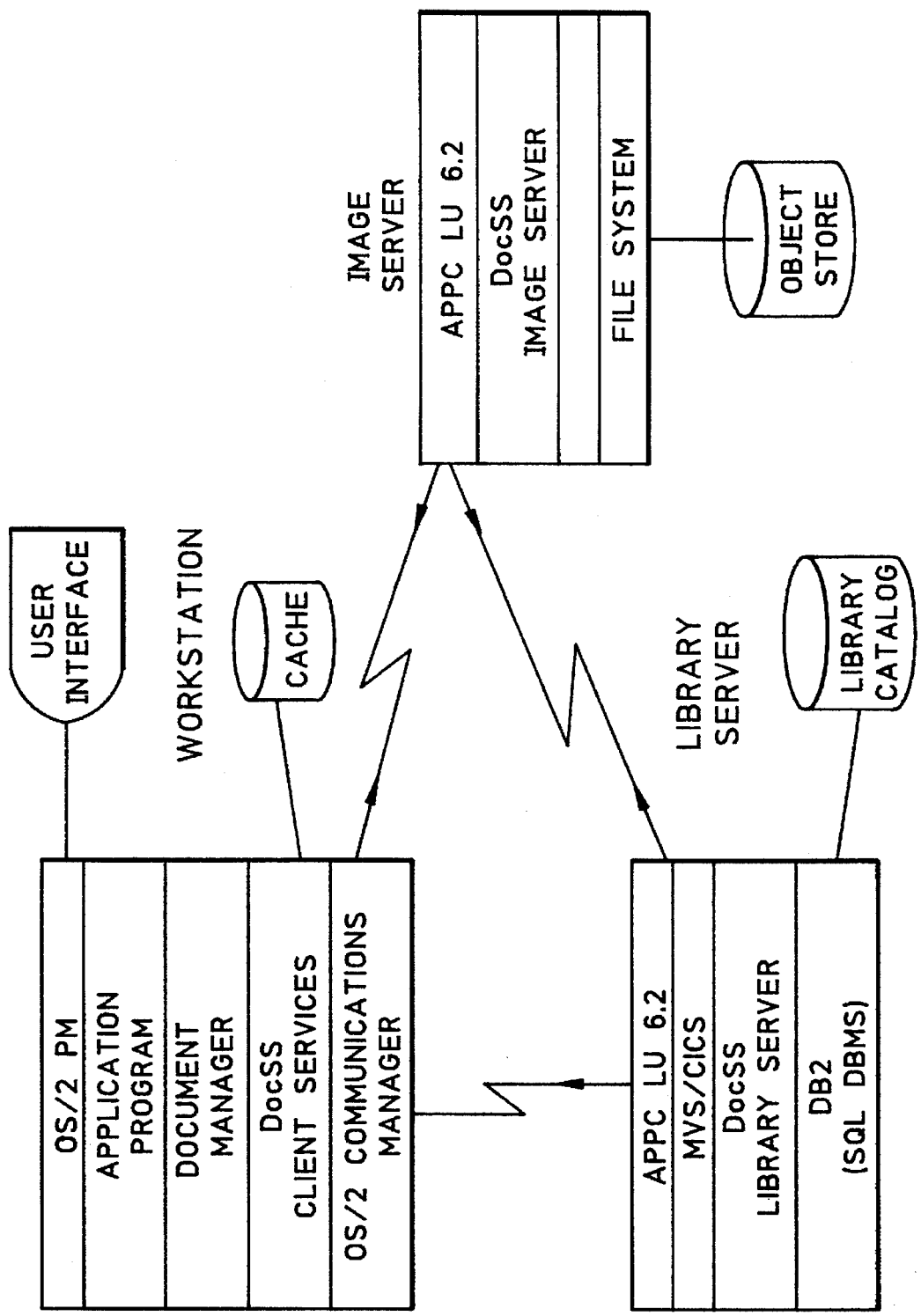
FIG. 10 illustrates a representative mode for practicing the invention.

The inventors have implemented the library service protocols described above in an operable pilot implementation illustrated in FIG. 10. The library service protocol procedures are denoted in the figure by the label (DocSS). The single instance of the library service protocols of the invention include: (1) basic file and database management services in the form of an SQL DBMS in the library server and a file system in an image server; (2) basic interprocess and intermachine communication services in the client and the two servers; (3) DocSS, which has parts which execute in the user's workstation, in the library server, and in the image server; and (4) a document manager at the client workstation. In addition, to support a user, the instance includes (5) an application program particular to the application at hand which uses (6) basic presentation services, such as a screen, keyboard, printing and scanning support in the form of, for example, the OS/2 Presentation manager available from the assignee. Depending upon the kind of data involved, preparation of the application program would be substantially cheaper if subroutine libraries were available for image manipulation, data compression, and so forth. Finally, automatic services to encode data captured from paper and to create search indices automatically are highly desirable, but primarily available only as research experiments today.

This invention is disclosed as a system and a method. Thus, it can be understood by a person of ordinary skill in the art that a computer system, including appropriate components such as a CPU, memory, I/O, program storage and a connecting bus, may be programmed or otherwise designed to facilitate the practice of the method of this invention. Such a computer system would include appropriate program means for executing the method of this invention. Also, an article of manufacture such as a pre-recorded floppy disk or other similar computer program product for use with a library service system could include a storage medium and program means recorded thereon for directing the system components to facilitate the practice of the method of this invention. It can be understood by persons of ordinary skill in the art that such articles of manufacture also fall within the spirit and scope of this invention.

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

What is claimed is:

1. In a data library system for controlling user access to a library of images, an image being a data representation of a document or a portion of a document, the system including at least one processor coupled to a client store, a library server coupled to an access control store, a library storage resource to hold the library of images, and one or more image servers coupled to the library storage resource for storage or retrieval of images, a method for transferring an image between a client process executing on the processor and the library storage resource, the library server maintaining in the access control store means for authenticating user identities and a catalog of the images stored in the library storage resource, the catalog containing entries each identifying an image and an associated image server controlling the library storage resource storing the image, the data library system further including a message-passing communication facility connecting the processor, the library server, and the image servers for message-based communication, and the library storage resource further including means for validating the access control store authority associated with the library server, the method including the steps of:

the processor providing a first message from the client process to the library server, the first message including a new authenticating token, an associated request for transferring a requested image between the client process and the library and a name of an associated image port at the processor through which the requested image is to be transferred; in response to receipt by the library server of the first message, the library server using the authenticating means in the access control store to verify the new authenticating token, the library server using the catalog in the access control store to identify an associated image server with access to a library storage resource for storing the requested image, and the library server providing a second message from the library server to the associated image server, the second message including an image copy identifier unique to this request, a command for setting up transfer of the requested image between the client process and the library storage resource, and the name of the associated image port; in response to receipt by the associated image server of the second message, the associated image server using the validating means in the library storage resource and the unique image copy identifier to verify the authority of the library server to control the requested image, and the associated image server providing through the associated image port a third message to the processor for the client process including a command for transferring the requested image between the client process and the library storage resource through the associated image port; and in response to receipt by the processor of the third message, the processor and the associated image server transferring the requested image between the associated image port and the library storage resource under control of the associated image server.

2. The method of claim 1, further including:

the processor generating and retaining in the client store the new authenticating token for the client process before providing the first, second, and third messages;

the processor, the library server, and the associated image server including a copy of the new authenticating token in the first, second, and third messages, respectively;

the processor comparing the copy of the new authenticating token in the third message with the new authenticating token retained at the processor in the client store before the transferring step; and the processor continuing execution of the transferring step if the copy of the new authenticating token in the third message matches the new authenticating token retained in the client store; otherwise, the processor, the library server, and the associated image server terminating the method without transferring the requested image.

3. The method of claim 1, further including:

the processor generating and retaining in the client store the new authenticating token for the client process before providing the first, second, and third messages;

the processor, the library server, and the associated image server including a copy of the new authenticating token in the first, second, and third messages, respectively, and the associated image server retaining in the library storage resource a copy of the new authenticating token sent in the third message;

the step of transferring including the processor sending from the client process to the associated image server a fourth message including the requested image and a copy of the new authenticating token retained in the client store;

the associated image server comparing the copy of the new authenticating token in the fourth message with the copy of the new authenticating token retained in the library storage resource; and the associated image server storing the requested image in a library storage resource controlled by the associated image server if the copy of the new authenticating token in the fourth message matches the copy of the new authenticating token retained in the library storage resource; otherwise, the processor, the library server, and the associated image server terminating the method without storing the requested image.

4. The method of claim 1, further including:

the processor generating and retaining in the client store the new authenticating token for the client process before providing the first, second, and third messages;

the processor and the library server including a copy of the new authenticating token in the first and second messages, respectively;

in the step of the associated image server providing the third message, the associated image server including in the third message a copy of the new authenticating token received in the second message and retrieving a copy of the requested image from the library storage resource;

the processor comparing the copy of the new authenticating token in the third message with the new authenticating token retained in the client store; and the processor and the associated image server completing the transferring step by the processor receiving the copy of the requested image through the associated image port and retaining the copy of the requested image for the client process if the copy of the new authenticating token in the third message matches the new authenticating token retained in the client store; otherwise, the processor, the library server, and the associated image server terminating the method without the processor receiving the copy of the requested image.

5. The method of claim 1, further including:

the processor sending a fourth message from the client process to the associated image server confirming completion of the transferring step;

the associated image server sending a fifth message to the library server confirming completion of the transferring step;

the library server recording in the access control store catalog a result of the transferring step; and the library server sending a sixth message to the processor for the client process confirming completion of the transferring step.

6. In a data library system for controlling user access to a library of images, an image being a data representation of a document or a portion of a document, the system including a library server coupled to an access control store, a library storage resource for holding the library of images and one or more image servers coupled to the library storage resource for storage or retrieval of images, a method for removing images from the library, the library server maintaining in the access control store means for authenticating user identities and a library catalog of the images stored in the library storage resource, each image in the library being represented by an associated library catalog entry identifying the library storage location for the image and the identification of an associated image server controlling the library resource containing the image storage location, each image server maintaining a server catalog of images stored in the library storage resource under control of the associated image server, each image stored in the library storage resource being represented by an associated server catalog entry, the library storage resource further including means for validating the access control store authority associated with the library server, and the library system including a processor coupled to a client store for executing a client process and a message communication facility connecting the processor, the library server, and the image servers for message-based communication, the method including the steps of:

the processor providing a first message to the library server including a new authentication token and an associated request from the client process for deletion of a subject image from the library storage resource;

the library server, in response to the first message, using the authenticating means in the access control store to verify the new authenticating token, deleting the subject image entry from the library catalog in the access control store and enqueuing the deletion request with any other such deletion requests;

the processor sending a second message from the client process to the library server including a request for commitment of any enqueued deletion requests;

the library server, in response to the second message, committing library catalog changes in the access control store including deletion of the subject library catalog entry and providing to an associated image server controlling the library storage resource in which the requested image is stored a third message including a request for deletion from the library storage resource of the subject image; and the associated image server, in response to the third message, using the validating means in the library storage resource to verify the authority of the library server to control the requested image and deleting the subject image from the library storage resource.

7. The method of claim 6, wherein the library server deleting step includes the library server removing from the library storage resource the associated server catalog entry corresponding to the location where the requested image is stored in the library storage resource.

8. In a data library system for controlling user access to a library of images, an image being a data representation of a document or a portion of a document, the system including a library server coupled to an access control store, a library storage resource to hold the library of images and one or more image servers coupled to the library storage resource for storage or retrieval of those images, a method for replacing images in the library, the library server maintaining in the access control store means for authenticating user identities and a library catalog of the images stored in the library storage resource, each image in the library being represented by a respective library catalog entry identifying an image storage location in the library storage resource, identifying an image identifier (ID) unique to the image and including the identification of an associated image server controlling the library storage resource containing the image storage location, each image server maintaining in the storage resource a server catalog of the images stored in the library storage resource under control of the image server, each image stored in the library storage resource being represented by a respective server catalog entry identifying the image storage location in the library storage resource, the library system including a processor coupled to a client store for executing a client process and a message communication facility connecting the processor, the library server, and the image servers for message-based communication, the method including the steps of:

the processor sending a first message to the library server, the first message including a new authentication token, an associated request from the client process for deletion of a first image from the library and a first image identifier ID unique to the first image and indexed to an entry in the library catalog;

the processor sending a second message to the library server, the second message including a request from the client process for storage of a second image to replace the first image and the first image identifier ID, where the second message follows the first message;

the library server using the authenticating means in the access control store to verify the new authenticating token;

the library server generating in response to receipt of the second message a library catalog entry for the second image indexed to the first image identifier ID;

the library server sending a third message to an associated image server controlling the library storage resource where the first image is stored, the third message including a request for storing the second image;

the processor providing the second image from the client process to the associated image server;

the associated image server using the validating means in the library storage resource to verify the authority of the library server to control the first image; and the associated image server overwriting the first image with the second image.

9. The method of claim 8, wherein:

the generating step includes the step of the library server creating a second image identifier ID', and;

the third message includes a request to store the second image at a library storage resource location indexed to the second image identifier ID' in the server catalog of the associated image server;

the library server generating and retaining in the access control store an aliasing relation IDID' that indexes the first image identifier ID to the library storage resource location of the second image, the aliasing relation mapping to the second image all access requests to the first image received before the overwriting step; and the overwriting step including the steps of the processor providing a message from the client process to the library server for commitment of deletion of the first image and storage of the second image, the library server providing a message to the image server requesting that the first image be overwritten by the second image, the associated image server overwriting the first image with the second image, the associated image server changing from the first image identifier ID to the second image identifier ID' the index to the library storage resource location of the second image, and the library server deleting from the access control store the aliasing relation IDID'.

10. The method of claim 8, wherein the first image identifier ID is a multi-byte data object comprising:

a first portion including ten bytes of information, the first and ninth bytes including representations of respective characters randomly selected from a first character set and the remaining eight bytes including representations of respective characters randomly selected from a second character set; and a second portion appended to the first portion and including a multi-byte representation of an elapsed time.

11. In a data library system for controlling client process access to a library of images, an image being a data representation of a document, the system including a library server, a library storage resource to hold the library of images, and one or more image servers coupled to the library storage resource for storage or retrieval of images, a method for replacing images in the library, the library server maintaining in an access control store means for authenticating client process identities and a library catalog of the images stored in the library storage resource, each image in the library being represented by an associated library catalog entry identifying for the storage location for the image and the identification of an associated image server controlling the library storage resource containing the library storage location, each image server maintaining a server catalog of images stored in the library storage resource under control of the associated image server, each image stored in the library storage resource being represented by an associated server catalog entry that identifies the image storage location in the library storage resource, the library storage resource further including means for validating the access control store authority associated with the library server, and the library system including a processor coupled to a client store for executing a client process and a message communication facility connecting the processor, the library server, and the image servers for message-based communications, the method including the steps of:

the processor sending a first message from the client process to the library server, the first message including a new authentication token and a request for deletion of a first image from the library storage resource and further including a first image identifier ID unique to the first image and indexed to the image library catalog entry;

the processor sending a second message from the client process to the library server, the second message including a request for storage of a second image to replace the first image and further including the first image identifier ID, where the second message follows the first message;

the library server generating a second image identifier ID' unique to the storage request;

the library server sending a third message to an associated image server controlling the library storage resource where the first image is stored, the third message including a request for storing the second image at a library storage resource location indexed by the second image identifier ID';

the associated image server in response to the third message using the validating means in the library storage resource to verify the authority of the library server to control the second image;

the associated image server storing the second image in a library storage resource controlled by the associated image server at a storage location indexed by the second image identifier ID';

the library server generating an aliasing relation IDID' and storing the aliasing relation in a set of aliasing relations in response to storage of the second image;

the library server setting an alias flag bit in the library catalog entry corresponding to the first image identifier ID, the alias flag bit operating to direct all subsequent requests for access to the first image to the library storage resource location indexed by the second image identifier ID';

the processor providing a fourth message from the client process to the library server including a request for commitment of first image deletion and second image storage;

the library server providing a fifth message to the associated image server in response to receipt of the fourth message, the fifth message including a request that the first image be overwritten by the second image;

the associated image server overwriting the first image with the second image by changing the second image storage location index from the second image identifier ID' to the first image identifier ID; and the library server deleting the aliasing relation IDID' from the set of aliasing relations and resetting the aliasing flag in the library catalog entry indexed by the first image identifier ID.

12. In a data library system for storing a library of images, an image being a data representation of an information object, the data library system including a library server coupled to an access control store for controlling access to the library of images, a library storage resource to hold the library of images, one or more image servers coupled to the library storage resource for storage or retrieval of images, one or more processors each coupled to a client store for executing one or more client processes, and a message-passing communication facility connecting the library server, the image servers, and the one or more processors for message-based communications, a method for managing library service request messages comprising the steps of:

the one or more processors providing a sequence of messages from one or more client processes to the library server, each message including at least one library service request directed to an image server, each library service request specifying access to an image;

the library server authenticating the identity of the originating client process for each library service request and responsively accumulating from the sequence of messages a plurality of equivalent library service orders directed to an associated image server; and the library server sending the accumulated plurality of equivalent library service orders to the associated image server in a single message.

13. In a data library system for storing a library of images, an image being a data representation of an information object, the data library system including a library server coupled to an access control store for controlling access to the library of images, a library storage resource to hold the library of images, one or more processors each coupled to a client store for executing one or more client processes, one or more image servers coupled to the library storage resource for storage or retrieval of images, and a message-passing communication facility connecting the library server, the image servers, and the one or more processors for message based communications, a method for managing library service request messages comprising the steps of:

the one or more processors providing library service orders to the library server;

the library server authenticating the identity of the originating client process for each library service order and responsively providing to the image servers messages that each include at least one authenticated library service order for access to an image; and an associated image server receiving a plurality of authenticated library service orders, validating the library server authority to issue authenticated library service orders, generating responses to the authenticated and validated library service orders, accumulating responses to authenticated and validated library service orders, and sending to the library server the accumulated responses in a single message.

14. In a data library system for storing a library of images, an image being a data representation of an information object, the data library system including a library server coupled to an access control store containing a plurality of library catalog entries for controlling access to the library of images, a library storage resource to hold the library of images, one or more processors each coupled to a client store for executing one or more client processes, one or more image servers coupled to the library storage resource for storage or retrieval of images, and a message-passing communication facility connecting the library server, the image servers, and the one or more processors for message based communications, a method for managing requests to discard images from the library comprising the steps of:

the one or more processors sending to the library server one or more messages including library service orders for discarding images from the library;

the library server deleting from the access control store the library catalog entry for an associated image in response to each library service order to discard the associated image;

the library server enqueuing the library service discard order with other discard orders;

a processor sending a COMMIT order from a client process to the library server for commitment of library service discard orders enqueued for the client process; and the library server committing the library catalog entry deletions for the enqueued discard orders in response to the COMMIT order, thereby effectively discarding the associated images from the library storage resource.

15. In a data library system for controlling user access to a library of images, an image being a data representation of a document or a portion of a document, the system including one or more processors each coupled to a client store for executing one or more client processes, a library server coupled to an access control store, a library storage resource to hold the library of images, and one or more image servers coupled to the library storage resource for storage or retrieval of images, a method for moving an image between a client process and the library storage resource, the library server maintaining in the access control store a catalog of the images stored in the library storage resource, the catalog containing entries each identifying an image and an associated image server controlling the library storage resource for storing the image, the data library system further including a communication facility connecting the one or more processors, the library server, and the image servers for communication, and the library storage resource further including means for validating the access control store authority associated with the library server, the method including the steps of:

a processor providing a first communication to the library server, the first communication including a new authenticating token, an associated request for transferring a requested image between a client process and the library storage resource and a name of an associated image port at the processor through which the requested image is to be transferred; in response to receipt by the library server of the first communication, the library server using the authenticating means in the access control store to verify the new authenticating token, the library server using the catalog in the access control store to identify an associated image server with access to a library storage resource for storing the requested image, and the library server providing a second communication to the associated image server for setting up transfer of the image between the processor and the library storage resource, the second communication including an image copy identifier unique to this request and the name of the associated image port; in response to receipt by the associated image server of the second communication, the associated image server using the validating means in the library storage resource to verify the authority of the library server to control the requested image, and the associated image server providing a third communication to the processor and the library storage resource through the associated image port; and in response to receipt by the processor of the third communication, the processor and the associated image server transferring the image between the associated image port and the library storage resource under control of the associated image server.

16. The method of claim 15, further including:

the processor sending a fourth communication from the client process to the associated image server confirming completion of the transferring step;

the associated image server sending a fifth communication to the library server confirming completion of the transferring step;

the library server recording in the access control store catalog a result of the transferring step; and the library server sending a sixth communication to the processor confirming completion of the transferring step.

17. In a data library system for controlling user access to a library of images, an image being a data representation of a document or a portion of a document, the system including one or more processors each coupled to a client store for executing one or more client processes, a library server coupled to an access control store, a library server resource to hold the library of images, and one or more image servers coupled to the library storage resource for storage or retrieval of images, a method for copying an image stored at a first library location to a second library location, the library server maintaining in the access control store means for authenticating user identities and a catalog of the images stored in the library storage resource, the catalog containing entries each identifying an image and an associated image server controlling the library storage resource storing the image, the data library system further including a message-passing communication facility connecting the one or more processors, the library server, and the image servers for message-based communication, and the library storage resource further including means for validating the access control store authority associated with the library server, the method including the steps of:

a processor providing a first message from a client process to the library server, the first message including a new authenticating token, an associated request for copying a designated image and identification of a receiving library storage resource to which the designated image is to be copied;

the library server using the authenticating means in the access control store to verify the new authenticating token;

the library server determining a source image server that controls the source library resource location where the designated image is stored;

the library server providing a second message to a target image server that controls the receiving library storage resource identified as receiving the designated image;

the library server providing a third message to the source image server causing it to send the designated image to the target image server;

the source image server providing a fourth message to the target image server, the fourth message including the designated image;

the target image server providing a fifth message to the library server acknowledging receipt and storage of the designated image in the target library resource;

the target image server providing a sixth message to the source image server acknowledging receipt of the designated image;

the source image server providing a seventh message to the library server indicating completion of the transfer of the designated image to the target image server; and the library server providing an eighth message to the initiating processor confirming completion of the requested copying of the designated image.

18. In a data library system for controlling user access to a library of images, an image being a data representation of a document or a portion of a document, the system including at least one processor coupled to a client store, a library server coupled to an access control store, a library storage resource to hold the library of images, and one or more image servers coupled to the library storage resource for storage or retrieval of images, the library server maintaining in the access control store means for authenticating user identities and a catalog of the images stored in the library storage resource, the catalog containing entries each identifying an image and an associated image server controlling the library storage resource storing the image, the data library system further including a message-passing communication facility connecting the processor, the library server, and the image servers for message-based communication, and the library storage resource further including means for validating the access control store authority associated with the library server, a computer program product for use with the system to transfer images between a client process executing on the processor and the library storage resource, the computer program product comprising:

a recording medium;

means recorded on the recording medium for directing the processor to provide a first message from the client process to the library server, the first message including a new authenticating token, an associated request for transferring a requested image between the client process and the library and a name of an associated image port at the processor through which the requested image is to be transferred;

means recorded on the recording medium for directing, in response to receipt by the library server of the first message, the library server to use the authenticating means in the access control store to verify the new authenticating token, use the catalog in the access control store to identify an associated image server with access to a library storage resource for storing the requested image, and provide from the library server to the associated image server a second message including an image copy identifier unique to this request, a command for setting up transfer of the requested image between the client process and the library storage resource, and the name of the associated image port;

means recorded on the recording medium for directing, in response to receipt by the associated image server of the second message, the associated image server to use the validating means in the library storage resource and the unique image copy identifier to verify the authority of the library server to control the requested image, and provide through the associated image port a third message to the processor for the client process including a command for transferring the requested image between the client process and the library storage resource through the associated image port; and means recorded on the recording medium for directing, in response to receipt by the processor of the third message, the processor and the associated image server to transfer the requested image between the associated image port and the library storage resource under control of the associated image server.

19. The computer program product of claim 18, further comprising:

means recorded on the recording medium for directing the processor to generate and retain in the client store the new authenticating token for the client process before providing the first, second, and third messages;

means recorded on the recording medium for directing the processor, the library server, and the associated image server to include a copy of the new authenticating token in the first, second, and third messages, respectively;

means recorded on the recording medium for directing the processor to compare the copy of the new authenticating token in the third message with the new authenticating token retained at the processor in the client store; and means recorded on the recording medium for
directing the processor to transfer the requested image if the copy of the authenticating token in the third message matches the new authenticating token retained in the client store, otherwise,
directing the processor, the library server and the associated image server to terminate activity without transferring the requested image.

20. The computer program product of claim 18, further comprising:

means recorded on the recording medium for directing the processor to generate and retain in the client store the new authenticating token for the client process before providing the first, second, and third messages;

means recorded on the recording medium for directing the processor, the library server and the associated image server to include a copy of the new authenticating token in the first, second and third messages, respectively;

means recorded on the recording medium for directing the associated image server to retain in the library storage resource a copy of the new authenticating token sent in the third message;

means recorded on the recording medium for directing the processor to send from the client process to the associated image server a fourth message including the requested image and a copy of the new authenticating token retained in the client store;

means recorded on the recording medium for directing the associated image server to compare the copy of the new authenticating token in the fourth message with the copy of the new authenticating token retained in the library storage resource; and means recorded on the recording medium for
directing the associated image server to store the requested image in a library storage resource controlled by the associated image server if the copy of the new authenticating token in the fourth message matches the copy of the new authenticating token retained in the library storage resource, otherwise,
directing the processor, the library server and the associated image server to terminate activity without storing the requested image.

21. The computer program product of claim 18, further comprising:

means recorded on the recording medium for directing the processor to generate and retain in the client store the new authenticating token for the client process before providing the first, second and third messages;

means recorded on the recording medium for directing the processor and the library server to include a copy of the new authenticating token in the first and second messages, respectively;

means recorded on the recording medium for directing the associated image server to include in the third message a copy of the new authenticating token received in the second message and to retrieve a copy of the requested image from the library storage resource;

means recorded on the recording medium for directing the processor to compare the copy of the new authenticating token in the third message with the new authenticating token retained in the client store; and means recorded on the recording medium for
directing the processor and the associated image server to transfer to the receiving processor through the associated image port and retain the copy of the requested image for the client process if the copy of the new authenticating token in the third message matches the new authenticating token retained in the client store, otherwise,
directing the processor, the library server and the associated image server to terminate activity without the processor receiving the copy of the requested image.

22. The computer program product of claim 18, further comprising:

means recorded on the recording medium for directing the processor to send a fourth message from the client process to the associated image server confirming image transfer completion;

means recorded on the recording medium for directing the associated image server to send a fifth message to the library server confirming image transfer completion;

means recorded on the recording medium for directing the library server to record in the access control store catalog a result of the image transfer; and means recorded on the recording medium for directing the library server to send a sixth message to the processor for the client process confirming image transfer completion.

* * * * *